(12) United States Patent
Yamashita et al.

(10) Patent No.: US 12,359,063 B2
(45) Date of Patent: Jul. 15, 2025

(54) POLYCARBODIIMIDE COMPOSITION, PRODUCING METHOD OF POLYCARBODIIMIDE COMPOSITION, AQUEOUS DISPERSION COMPOSITION, SOLUTION COMPOSITION, RESIN COMPOSITION, RESIN CURED PRODUCT, AND CARBODIIMIDE CROSS-LINKING AGENT FOR FIBER TREATMENT

(71) Applicant: MITSUI CHEMICALS, INC., Tokyo (JP)

(72) Inventors: Tatsuya Yamashita, Ichihara (JP); Yohei Koyama, Tokyo (JP); Hirokazu Morita, Chiba (JP); Kazuyuki Fukuda, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 952 days.

(21) Appl. No.: 17/265,040

(22) PCT Filed: Aug. 5, 2019

(86) PCT No.: PCT/JP2019/030706
§ 371 (c)(1),
(2) Date: Feb. 1, 2021

(87) PCT Pub. No.: WO2020/031951
PCT Pub. Date: Feb. 13, 2020

(65) Prior Publication Data
US 2021/0380804 A1    Dec. 9, 2021

(30) Foreign Application Priority Data

Aug. 10, 2018  (JP) .................... 2018-150929
Jul. 26, 2019  (JP) .................... 2019-138079
Jul. 26, 2019  (JP) .................... 2019-138080

(51) Int. Cl.
C08G 18/73    (2006.01)
C08G 18/48    (2006.01)
(Continued)

(52) U.S. Cl.
CPC ............ C08L 75/00 (2013.01); C08G 18/485 (2013.01); C08G 18/4854 (2013.01);
(Continued)

(58) Field of Classification Search
CPC . C08G 18/3206; C08G 18/2815; C08G 18/32
See application file for complete search history.

(56) References Cited

U.S. PATENT DOCUMENTS 5,929,188 A    7/1999    Nakamura et al.
6,124,398 A    9/2000    Imashiro et al.
(Continued)

FOREIGN PATENT DOCUMENTS

JP    10-30024 A    2/1998
JP    10-316930 A   12/1998
(Continued)

OTHER PUBLICATIONS

International Search Report dated Nov. 5, 2019 filed in PCT/JP2019/030706.

*Primary Examiner* — Catherine S Branch
*Assistant Examiner* — Huihong Qiao
(74) *Attorney, Agent, or Firm* — RANKIN, HILL & CLARK LLP

(57) ABSTRACT

A polycarbodiimide composition is obtained by subjecting a reaction product of a straight-chain aliphatic diisocyanate and alcohols to carbodiimidization, and the alcohols include a polyol and a monool; in the alcohols, a mole ratio (hydroxyl group derived from polyol/hydroxyl group derived from monool) of the amount of hydroxyl groups derived from the polyol to the amount of hydroxyl groups (Continued)

derived from the monool is below 2.0; and a carbodiimide equivalent of the polycarbodiimide composition is 300 g/mol or more and below 550 g/mol.

12 Claims, 1 Drawing Sheet

(51) Int. Cl.
  *C08L 75/00* (2006.01)
  *C08L 75/06* (2006.01)
(52) U.S. Cl.
  CPC .............. *C08G 18/73* (2013.01); *C08L 75/06* (2013.01); *C08L 2201/54* (2013.01); *C08L 2201/56* (2013.01)

(56) References Cited

U.S. PATENT DOCUMENTS

| | | | |
|---|---|---|---|
| 6,211,293 | B1 | 4/2001 | Nakamura et al. |
| 7,439,316 | B2 | 10/2008 | Hesselmans et al. |
| 2006/0003085 | A1 | 1/2006 | Takahashi et al. |
| 2010/0076153 | A1 | 3/2010 | Hesselmans et al. |
| 2013/0338330 | A1 | 12/2013 | Nakagawa et al. |
| 2016/0083503 | A1 | 3/2016 | Nakagawa et al. |
| 2016/0090368 | A1 | 3/2016 | Nakagawa et al. |
| 2018/0148533 | A1 | 5/2018 | Yamashita et al. |
| 2020/0017628 | A1* | 1/2020 | Banno .................... C08G 18/83 |

FOREIGN PATENT DOCUMENTS

| | | |
|---|---|---|
| JP | 2000-154226 A | 6/2000 |
| JP | 2002-3564 A | 1/2002 |
| JP | 2002-187932 A | 7/2002 |
| JP | 2010-285603 A | 12/2010 |
| JP | 2011-252120 A | 12/2011 |
| JP | 2013-18824 A | 1/2013 |
| JP | 2018-104605 A | 7/2018 |
| WO | 2012/121291 A1 | 9/2012 |
| WO | 2017/119443 A1 | 7/2017 |

* cited by examiner

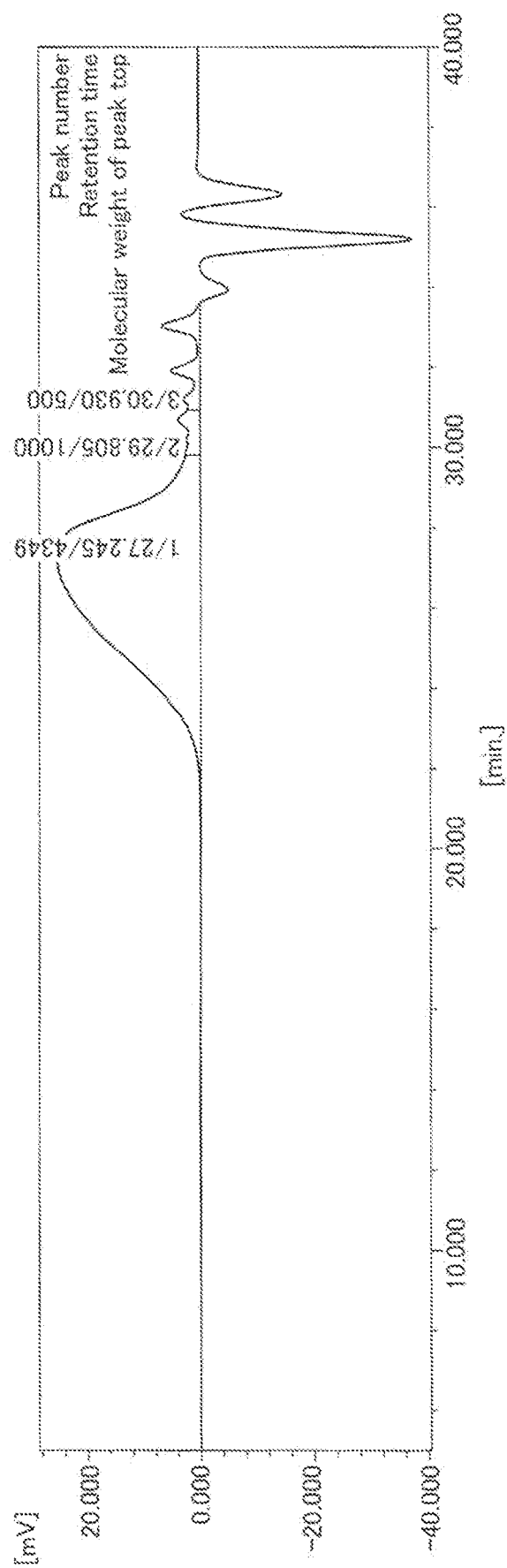

POLYCARBODIIMIDE COMPOSITION, PRODUCING METHOD OF POLYCARBODIIMIDE COMPOSITION, AQUEOUS DISPERSION COMPOSITION, SOLUTION COMPOSITION, RESIN COMPOSITION, RESIN CURED PRODUCT, AND CARBODIIMIDE CROSS-LINKING AGENT FOR FIBER TREATMENT

TECHNICAL FIELD

The present invention relates to a polycarbodiimide composition, a method for producing a polycarbodiimide composition, an aqueous dispersion composition, a solution composition, a resin composition, a resin cured product, and a carbodiimide cross-linking agent for fiber treatment.

BACKGROUND ART

Conventionally, a resin composition containing a main agent and a curing agent has been known in the fields of adhesives, coating agents, and the like, and as a curing agent, for example, a carbodiimide-based curing agent has been known.

More specifically, a polycarbodiimide composition obtained by subjecting a pentamethylene diisocyanate, and a polyethylene glycol monomethyl ether having a molecular weight of 550 and a 1-methoxy-2-propanol (both of which are a monool) to a urethanization reaction, followed by a carbodiimidization reaction, and furthermore, subjecting the mixture to a urethanization reaction by adding a 1-methoxy-2-propanol has been proposed (ref: for example, Patent Document 1 (Example 1)).

Then, a resin cured product such as a coating film can be obtained by drying and curing the resin composition composed of the polycarbodiimide composition (curing agent) and the main agent.

The polycarbodiimide composition and the resin composition have excellent low-temperature fast curability, and the obtained resin cured product has excellent various properties such as water resistance and chemical resistance.

CITATION LIST

Patent Document

Patent Document 1: International Publication WO2017/119443

SUMMARY OF THE INVENTION

Problem to be Solved by the Invention

On the other hand, thermal stability may be required for the polycarbodiimide composition in accordance with the application, and furthermore, further chemical resistance may be required for the resin cured product in accordance with the application. In particular, for example, colour fastness to rubbing at the time of textile printing treatment at a relatively low temperature is required in the application of fiber treatment.

The present invention provides a polycarbodiimide composition which is capable of obtaining a cured product having excellent chemical resistance and has excellent thermal stability, a method for producing the polycarbodiimide composition, an aqueous dispersion composition and a solution composition including the polycarbodiimide composition, a resin composition including the polycarbodiimide composition, furthermore, a resin cured product obtained by curing the resin composition, and in addition, a carbodiimide cross-linking agent for fiber treatment which is capable of improving the colour fastness to rubbing at the time of textile printing treatment at a relatively low temperature.

Means for Solving the Problem

The present invention [1] includes a polycarbodiimide composition including a carbodiimide modified product of a reaction product of a straight-chain aliphatic diisocyanate and alcohols, wherein the alcohols include a polyol and a monool; in the alcohols, a mole ratio (hydroxyl group derived from polyol/hydroxyl group derived from monool) of the amount of hydroxyl groups derived from the polyol to the amount of hydroxyl groups derived from the monool is below 2.0; and a carbodiimide equivalent of the polycarbodiimide composition is 300 g/mol or more and below 550 g/mol.

The present invention [2] includes the polycarbodiimide composition described in the above-described [1], wherein a molecular weight of the polyol is 120 or more and 1000 or less.

The present invention [3] includes the polycarbodiimide composition described in the above-described [1] or [2], wherein an average functionality of the polyol is 2.

The present invention [4] includes the polycarbodiimide composition described in any one of the above-described [1] to [3], wherein the straight-chain aliphatic diisocyanate is a 1,5-pentane diisocyanate.

The present invention [5] includes the polycarbodiimide composition described in any one of the above-described [1] to [4], wherein in chromatogram obtained when the polycarbodiimide composition is measured by gel permeation chromatography, an area ratio of the peak area having a molecular weight of 500 or less in terms of polystyrene to the total peak area is 6.5% or less, and an area ratio of the peak area having a molecular weight of 1000 or less in terms of polystyrene to the total peak area is 10.0% or less.

The present invention [6] includes a method for producing a polycarbodiimide composition including a urethanization step of subjecting a straight-chain aliphatic diisocyanate and alcohols to a urethanization reaction, and a carbodiimidization step of heating a reaction product in the urethanization step in the presence of a carbodiimidization catalyst and subjecting the reaction product to a carbodiimidization reaction, wherein the alcohols include a polyol and a monool; in the alcohols, a mole ratio (hydroxyl group derived from the polyol/hydroxyl group derived from the monool) of the amount of hydroxyl groups derived from the polyol to the amount of hydroxyl groups derived from the monool is below 2.0; and in the urethanization step, an equivalent ratio (NCO/OH) of isocyanate groups of the straight-chain aliphatic diisocyanate to the total amount of hydroxyl groups of the monool and hydroxyl groups of the polyol is 3 or more and below 8.

The present invention [7] includes an aqueous dispersion composition being an aqueous dispersion solution obtained by dispersing the polycarbodiimide composition described in any one of the above-described [1] to [5] in water at a ratio of solid content concentration of 5% by mass or more and 90% by mass or less.

The present invention [8] includes a solution composition being a solution obtained by dissolving the polycarbodiimide composition described in any one of the above-described

[1] to [5] in an organic solvent at a ratio of solid content concentration of 5% by mass or more and 90% by mass or less.

The present invention [9] includes a resin composition including a main agent having a carboxyl group and a curing agent including the polycarbodiimide composition described in any one of the above-described [1] to [5].

The present invention [10] includes a resin cured product being a cured product of the resin composition described in the above-described [9].

The present invention [11] includes a carbodiimide cross-linking agent for fiber treatment including the polycarbodiimide composition described in the above-described [1].

Effect of the Invention

In the polycarbodiimide composition of the present invention, since alcohols of a raw material component include a polyol and a monool at a predetermined ratio, a carbodiimide modified product is increased in molecular weight as compared with a case where the alcohols do not include the polyol. Specifically, a prepolymer is obtained by reaction of a straight-chain aliphatic diisocyanate with the alcohols including the polyol, and since the prepolymer is carbodiimidized, a carbodiimide modified product having a relatively high molecular weight is obtained. As a result, a cured film having excellent chemical resistance can be obtained from the polycarbodiimide composition.

On the other hand, when the carbodiimide modified product is excessively increased in molecular weight, it may tend to be thickened and inferior in thermal stability. On the other hand, in the polycarbodiimide composition of the present invention, since a ratio of the polyol and the monool is adjusted, the carbodiimide modified product stays appropriately high in molecular weight and has excellent thermal stability.

Furthermore, in the polycarbodiimide composition of the present invention, since a carbodiimide equivalent is adjusted to a predetermined ratio, a cured film having excellent appearance and excellent chemical resistance can be obtained.

Therefore, the polycarbodiimide composition of the present invention, the aqueous dispersion composition of the present invention and the solution composition of the present invention including the polycarbodiimide composition, and the resin composition of the present invention including the polycarbodiimide composition have excellent thermal stability, and furthermore, a cured product having excellent appearance and excellent chemical resistance can be obtained.

Further, the resin cured product of the present invention has excellent appearance and excellent chemical resistance.

Further, since the carbodiimide cross-linking agent for fiber treatment of the present invention includes the above-described polycarbodiimide composition, it is possible to improve colour fastness to rubbing at the time of textile printing treatment at a relatively low temperature (120° C. or less).

BRIEF DESCRIPTION OF THE DRAWINGS

FIG. 1 shows GPC chromatogram of a polycarbodiimide composition obtained in Example 1.

DESCRIPTION OF EMBODIMENTS

A polycarbodiimide composition of the present invention includes a carbodiimide modified product which is a reaction product of a straight-chain aliphatic diisocyanate and alcohols as a main component (for example, at a ratio of 90% by mass or more with respect to the polycarbodiimide composition).

The carbodiimide modified product can be obtained by subjecting the reaction product of the straight-chain aliphatic diisocyanate and the alcohols to a carbodiimidization reaction.

Examples of the straight-chain aliphatic diisocyanate include straight-chain aliphatic diisocyanates having 1 to 20 carbon atoms such as ethylene diisocyanate, 1,3-propane diisocyanate, 1,4-butane diisocyanate, 1,5-pentane diisocyanate (pentamethylene diisocyanate, PDI), 1,6-hexane diisocyanate (hexamethylene diisocyanate, HDI), 1,8-octane diisocyanate (octamethylene diisocyanate), and 1,12-dodecane diisocyanate (dodecamethylene diisocyanate).

These straight-chain aliphatic diisocyanates may be used alone or in combination of two or more.

By using the straight-chain aliphatic diisocyanate, the polycarbodiimide composition having excellent thermal stability can be obtained, in addition, a resin cured product (described later) having excellent appearance and excellent chemical resistance can be obtained, and in addition, improvement in low-temperature curability and colour fastness to rubbing in the application of a carbodiimide curing agent for fiber treatment (described later) can be achieved.

As the straight-chain aliphatic diisocyanate, from the viewpoint of the thermal stability, the appearance, and the chemical resistance, and in addition, the low-temperature curability and the colour fastness to rubbing in the application of the carbodiimide curing agent for fiber treatment (described later), preferably, a 1,5-pentane diisocyanate (pentamethylene diisocyanate, PDI) and a 1,6-hexane diisocyanate (hexamethylene diisocyanate, HDI) are used, more preferably, a 1,5-pentane diisocyanate (pentamethylene diisocyanate, PDI) is used.

In particular, since the 1,5-pentane diisocyanate has a smaller number of carbon atoms and a smaller molecular weight than the 1,6-hexane diisocyanate, when the polycarbodiimide composition having the same molecular weight is produced, in a case where the 1,5-pentane diisocyanate is used, the carbodiimide group concentration in the polycarbodiimide composition can be increased as compared with a case where the 1,6-hexane diisocyanate is used. As a result, the polycarbodiimide composition having excellent low-temperature fast curability can be obtained, and furthermore, the resin cured product (described later) having excellent various properties (appearance, chemical resistance, and the like) can be obtained. Further, as compared with the 1,6-hexane diisocyanate having an even number of carbon atoms, since the 1,5-pentane diisocyanate having an odd number of carbon atoms has low crystallinity due to an amorphous structure derived from the odd number of carbon atoms, flowability and dispersibility are excellent, the properties of the resin cured product to be obtained (described later) are improved, and in addition, the low-temperature curability and the colour fastness to rubbing in the application of the carbodiimide curing agent for fiber treatment (described later) are improved.

Furthermore, when the 1,5-pentamethylene diisocyanate is used, thermal decomposition of a uretonimine group to be described later tends to occur as compared with a case where the 1,6-hexamethylene diisocyanate is used, and therefore, the polycarbodiimide composition can be obtained in good yield. Further, since it can be handled even at a low temperature, it is possible to suppress the high molecular weight of uretonimine.

The alcohols include a polyol and a monool, and preferably consist of the polyol and the monool.

The polyol is an organic compound having two or more hydroxyl groups in a molecule, and examples thereof include a monomer polyol and a polymer polyol.

The monomer polyol is an organic monomer (single compound (hereinafter, the same)) having two or more hydroxyl groups in a molecule, and examples thereof include dihydric alcohols such as ethylene glycol, propylene glycol, 1,3-propanediol, 1,4-butanediol, 1,3-butanediol, 1,2-butanediol, 1,5-pentanediol, 1,6-hexanediol, 1,8-octanediol, 1,10-decanediol, 1,12-dodecanediol, 1,14-tetradecanediol, 1,16-hexadecanediol, 1,18-octadecanediol, 1,20-eicosanediol, neopentyl glycol, 3-methyl-1,5-pentanediol, 2,2,2-trimethylpentanediol, 3,3-dimethylolheptane, alkane (C2 to C20) diol, 1,3- or 1,4-cyclohexanedimethanol and mixtures thereof, 1,3- or 1,4-cyclohexanediol and mixtures thereof, hydrogenated bisphenol A, 1,4-dihydroxy-2-butene, 2,6-dimethyl-1-octene-3,8-diol, bisphenol A, diethylene glycol, triethylene glycol, and dipropylene glycol; trihydric alcohols such as glycerin, trimethylolpropane, and triisopropanolamine; tetrahydric alcohols such as tetramethylolmethane (pentaerythritol) and diglycerin; pentahydric alcohols such as xylitol; hexahydric alcohols such as sorbitol, mannitol, allitol, iditol, dulcitol, altritol, inositol, and dipentaerythritol; heptahydric alcohols such as perseitol; and octahydric alcohols such as sucrose.

These monomer polyols may be used alone or in combination of two or more.

As the monomer polyol, preferably, a dihydric alcohol is used, more preferably, a 1,6-hexanediol and a 1,10-decanediol are used.

The polymer polyol is an organic polymer (polymer compound (hereinafter, the same)) having two or more hydroxyl groups in a molecule, and examples thereof include polyether polyol, polyester polyol, polycarbonate polyol, polyurethane polyol, epoxy polyol, vegetable oil polyol, polyolefin polyol, acrylic polyol, and vinyl monomer-modified polyol. Preferably, a polyether polyol, a polyester polyol, and a polycarbonate polyol are used.

Examples of the polyether polyol include a polyoxyalkylene (2 to 3 carbon atoms) polyol and a polytetramethylene ether polyol.

An example of the polyoxyalkylene (2 to 3 carbon atoms) polyol includes an addition polymer of an alkylene oxide having 2 to 3 carbon atoms using a monomer polyol, a known monomer (low molecular weight) polyamine, and the like as an initiator.

An example of the monomer polyol includes the monomer polyol described above, and preferably, a dihydric alcohol and a trihydric alcohol are used, more preferably, a dihydric alcohol is used.

Examples of the alkylene oxide having 2 to 3 carbon atoms include a propylene oxide (1,2-propylene oxide) and an ethylene oxide. In addition, these alkylene oxides may be used alone or in combination of two or more.

Specifically, examples of the polyoxyalkylene (2 to 3 carbon atoms) polyol include a polyoxyethylene glycol, a polyoxypropylene glycol, and a polyoxyethylene-polyoxypropylene glycol (random and/or block copolymer of propylene oxide and ethylene oxide).

Furthermore, an example of the polyoxyalkylene (2 to 3 carbon atoms) polyol includes a polytrimethylene glycol.

An example of the polytrimethylene ether glycol includes a glycol obtained by a polycondensation reaction of a 1,3-propanediol derived from a plant component.

Examples of the polytetramethylene ether polyol include a ring-opening polymer (polytetramethylene ether glycol (crystalline)) obtained by cationic polymerization of tetrahydrofuran, and an amorphous (non-crystalline) polytetramethylene ether glycol obtained by copolymerizing an alkyl substituted tetrahydrofuran and the above-described dihydric alcohol with a polymerization unit such as tetrahydrofuran.

An example of the polyester polyol includes a polycondensate obtained by reacting a monomer polyol with a polybasic acid under known conditions.

An example of the monomer polyol includes the monomer polyol described above, and preferably, a dihydric alcohol is used.

Examples of the polybasic acid include saturated aliphatic dicarboxylic acids (C11 to C13) such as oxalic acid, malonic acid, succinic acid, methylsuccinic acid, glutaric acid, adipic acid, 1,1-dimethyl-1,3-dicarboxypropane, 3-methyl-3-ethylglutaric acid, azelaic acid, and cebacic acid; unsaturated aliphatic dicarboxylic acids such as maleic acid, fumaric acid, and itaconic acid; aromatic dicarboxylic acids such as phthalic acid, isophthalic acid, terephthalic acid, toluene dicarboxylic acid, and naphthalene dicarboxylic acid; alicyclic dicarboxylic acids such as hexahydrophthalic acid; other carboxylic acids such as dimer acid, hydrogenated dimer acid, and HET acid; acid anhydrides derived from the carboxylic acids such as oxalic anhydride, succinic anhydride, maleic anhydride, phthalic anhydride, 2-alkyl (C12 to C18) succinic anhydride, tetrahydrophthalic anhydride, trimellitic anhydride; and furthermore, acid halides derived from the carboxylic acids such as oxalic acid dichloride, adipic acid dichloride, and sebacic acid dichloride.

These polybasic acids may be used alone or in combination of two or more.

As the polybasic acid, preferably, a saturated aliphatic dicarboxylic acid, an aromatic dicarboxylic acid, and an acid anhydride are used.

Further, an example of the polyester polyol includes a polyester polyol derived from a plant, and specifically, an example thereof includes a vegetable oil-based polyester polyol obtained by subjecting a hydroxycarboxylic acid such as a hydroxyl group-containing vegetable oil fatty acid (for example, castor oil fatty acid containing a ricinoleic acid, hydrogenated castor oil fatty acid containing a 12-hydroxystearic acid, and the like) to a condensation reaction under known conditions using the above-described monomer polyol as an initiator.

Further, examples of the polyester polyol include lactone-based polyester polyols such as a polycaprolactone polyol and a polyvalerolactone polyol obtained by ring-opening polymerization of lactones such as ε-caprolactone and γ-valerolactone, and lactides such as L-lactide and D-lactide using the above-described monomer polyol (preferably, dihydric to trihydric alcohols) as an initiator, and furthermore, an alcohol-modified lactone polyol obtained by copolymerizing the above-described dihydric alcohol with the lactone-based polyester polyol.

Examples of the polycarbonate polyol include a ring-opening polymer (crystalline polycarbonate polyol) of ethylene carbonate using the above-described monomer polyol (preferably, the above-described dihydric alcohol) as an initiator, and an amorphous polycarbonate polyol obtained by copolymerizing a dihydric alcohol having 4 to 6 carbon atoms (1,4-butanediol, 1,5-pentanediol, 3-methyl-1,5-pentanediol, 1,6-hexanediol, and the like) with the ring-opening polymer. Further, an example thereof includes a plant-derived polycarbonate polyol derived from a plant-derived raw material such as isosorbide. Amorphous indicates liquid at normal temperature (25° C.). In addition, crystalline indicates solid at normal temperature (25° C.).

These polymer polyols may be used alone or in combination of two or more.

From the viewpoint of improving the thermal stability of the polycarbodiimide composition and improving the low-temperature curability and the colour fastness to rubbing in the application of the carbodiimide curing agent for fiber treatment (described later), as the polymer polyol, preferably, a polyether polyol and a polyester polyol (preferably, a lactone-based polyester polyol) are used, more preferably, a polyether polyol is used, further more preferably, a polytetramethylene ether polyol is used.

These polyols may be used alone or in combination of two or more.

As the polyol, preferably, a polymer polyol is used.

A molecular weight of the polyol (average molecular weight of the polyol when used in combination) is, for example, 60 or more, preferably 100 or more, more preferably 120 or more, further more preferably 150 or more, particularly preferably 200 or more from the viewpoint of improving the thermal stability of the polycarbodiimide composition, and in addition, improving the low-temperature curability and the colour fastness to rubbing in the application of the carbodiimide curing agent for fiber treatment (described later), and is, for example, 5000 or less, preferably 2000 or less, more preferably 1000 or less, further more preferably 800 or less, particularly preferably 500 or less from the viewpoint of the chemical resistance of the resin cured product (described later).

When the molecular weight of the polyol is within the above-described range, the polycarbodiimide composition can obtain excellent thermal stability, also can obtain the resin cured product (described later) having excellent chemical resistance, and in addition, can obtain excellent low-temperature curability and excellent colour fastness to rubbing in the application of the carbodiimide curing agent for fiber treatment (described later).

A molecular weight of the monomer polyol can be calculated from the molecular skeleton and the number of atoms. Further, a molecular weight of the polymer polyol is determined as the molecular weight in terms of standard polystyrene by gel permeation chromatography measurement as a number average molecular weight. Then, the molecular weight of the polyol is calculated as an average value of the molecular weight of each component.

In addition, an average functionality of the polyol is, for example, 2 or more, and for example, 8 or less, preferably 6 or less, more preferably 4 or less, further more preferably 3 or less, particularly preferably 2 from the viewpoint of improving the thermal stability of the polycarbodiimide composition, and in addition, improving the low-temperature curability and the colour fastness to rubbing in the application of the carbodiimide curing agent for fiber treatment (described later), The monool is an organic compound having one hydroxyl group in a molecule, and examples thereof include a monomer monool and a polymer monool.

The monomer monool is an organic monomer having one hydroxyl group in a molecule, and examples thereof include aliphatic monools such as methanol, ethanol, propanol, isopropanol, butanol, isobutanol, s-butanol, t-butanol, hexanol, cyclohexanol, heptanol, octanol, 2-ethylhexanol, nonyl alcohol, isononyl alcohol, decanol (10 carbon atoms), lauryl alcohol (12 carbon atoms), cetyl alcohol (14 carbon atoms), stearyl alcohol (18 carbon atoms), oleyl alcohol (18 carbon atoms), and eicosanol (20 carbon atoms); ether monools such as 1-methoxy-2-propanol, 1-ethoxy-2-propanol, ethylene glycol monomethyl ether (also known as methylcellosolve), and diethylene glycol monoethyl ether (also known as ethyl carbitol); and aromatic alcohols such as phenol and derivatives thereof, benzyl alcohol and derivatives thereof, phenethyl alcohol and derivatives thereof, and naphthol and derivatives thereof.

These monomer monools may be used alone or in combination of two or more.

As the monomer monool, preferably, an aliphatic monool is used, more preferably, an aliphatic monool having 2 to 6 carbon atoms is used, further more preferably, an isobutanol is used.

The polymer monool is an organic polymer having one hydroxyl group in a molecule, and an example thereof includes a capped product in which an end of the polymer polyol is capped with an alkyl group and the like except for one end.

More specifically, an example thereof includes a capped product (hereinafter, may be referred to as a one end-capped polymer diol) in which one end of a bifunctional polymer polyol (polymer diol) is capped with an alkyl group and the like.

Examples of the one end-capped polymer diol include one end-capped polyether diol, one end-capped polyester diol, one end-capped polycarbonate diol, one end-capped polyurethane diol, one end-capped epoxy diol, one end-capped vegetable oil diol, one end-capped polyolefin diol, one end-capped acrylic diol, and one end-capped vinyl monomer-modified diol, and preferably, a one end-capped polyether diol is used.

As the one end-capped polyether diol, more preferably, a one end-capped polyoxyethylene glycol, a one end-capped polyoxyethylene-polyoxypropylene glycol, and the like are used.

The one end-capped polyoxyethylene glycol is a polyethylene glycol monoalkyl ether in which one end hydroxyl group of the polyoxyethylene glycol is capped with an alkyl group (that is, the hydroxyl group is substituted with an oxyalkylene group).

The one end-capped polyoxyethylene-polyoxypropylene glycol is not particularly limited, and can be obtained by a known method.

In the polyethylene glycol monoalkyl ether, the number of carbon atoms of the alkyl group is 1 or more, and for example, 20 or less, preferably 8 or less, more preferably 6 or less, further more preferably 4 or less, particularly preferably 2 or less. In other words, examples of the alkyl group for capping one end include a methyl group and an ethyl group.

Specifically, examples of the polyethylene glycol monoalkyl ether include a polyethylene glycol monomethyl ether and a polyethylene glycol monoethyl ether.

The one end-capped polyoxyethylene-polyoxypropylene glycol is a polyoxyethylene-polyoxypropylene glycol monoalkyl ether in which one end hydroxyl group of the polyoxyethylene-polyoxypropylene glycol is capped with an alkyl group (that is, the hydroxyl group is substituted with an oxyalkylene group).

The one end-capped polyoxyethylene-polyoxypropylene glycol is not particularly limited, and can be obtained by a known method. Specifically, for example, the one end-capped polyoxyethylene-polyoxypropylene glycol can be obtained by subjecting an ethylene oxide and a propylene oxide to an addition reaction using a monohydric alcohol (monoalkyl ether of the dipropylene glycol and the like) in which one end hydroxyl group of the dihydric alcohol described above is capped with an alkyl group as an initiator.

In the polyoxyethylene-polyoxypropylene glycol monoalkyl ether, the number of carbon atoms of the alkyl group is 1 or more, and for example, 20 or less, preferably 8 or less, more preferably 6 or less, further more preferably 4 or less, particularly preferably 2 or less. In other words, as the alkyl group for capping one end, preferably, a methyl group and an ethyl group are used.

Specifically, examples of the polyoxyethylene-polyoxypropylene glycol monoalkyl ether include polyoxyethylene-polyoxypropylene glycol monomethyl ether and polyoxyethylene-polyoxypropylene glycol monoethyl ether.

In addition, in the polyoxyethylene-polyoxypropylene glycol monoalkyl ether, a ratio of an oxyethylene group to the total mass of the oxyethylene group and an oxypropylene group is, for example, 1% by mass or more, preferably 10% by mass or more, more preferably 20% by mass or more, further more preferably 30% by mass or more, and for example, 99% by mass or less, preferably 90% by mass or less, more preferably 80% by mass or less, further more preferably 70% by mass or less from the viewpoint of balance of aqueous dispersibility and water resistance.

These polymer monools may be used alone or in combination of two or more.

As the polymer monool, from the viewpoint of improving the thermal stability, the appearance, and the chemical resistance, and in addition, improving the low-temperature curability and the colour fastness to rubbing in the application of the carbodiimide curing agent for fiber treatment (described later), preferably, a one end-capped polyoxyethylene-polyoxypropylene glycol is used.

These monools may be used alone or in combination of two or more.

As the monool, preferably, a polymer monool is used alone or a polymer monool and a monomer monool are used in combination. More preferably, a polymer monool is used alone.

When the polymer monool and the monomer monool are used in combination, as a combination ratio of these, from the viewpoint of improving the thermal stability, the appearance, and the chemical resistance, and in addition, improving the low-temperature curability and the colour fastness to rubbing in the application of the carbodiimide curing agent for fiber treatment (described later), a ratio of the polymer monool with respect to the total moles of these is, for example, 50 mol % or more, preferably 70 mol % or more, and for example, 90 mol % or less, preferably 80 mol % or less, and a ratio of the monomer monool with respect to the total moles of these is, for example, 10 mol % or more, preferably 20 mol % or more, and for example, 50 mol % or less, preferably 30 mol % or less.

A molecular weight of the monool (average molecular weight of the monool when used in combination) is, for example, 50 or more, preferably 100 or more, more preferably 200 or more, further more preferably 400 or more from the viewpoint of improving the thermal stability of the polycarbodiimide composition, and in addition, improving the low-temperature curability and the colour fastness to rubbing in the application of the carbodiimide curing agent for fiber treatment (described later), and is, for example, 5000 or less, preferably 3000 or less, more preferably 2000 or less, further more preferably 1000 or less from the viewpoint of improving the chemical resistance of the resin cured product (described later) and in addition, improving the low-temperature curability and the colour fastness to rubbing in the application of the carbodiimide curing agent for fiber treatment (described later).

When the molecular weight of the monool is within the above-described range, the polycarbodiimide composition can obtain excellent thermal stability, also can obtain the resin cured product (described later) having excellent chemical resistance, and in addition, can obtain excellent low-temperature curability and excellent colour fastness to rubbing in the application of the carbodiimide curing agent for fiber treatment (described later).

A molecular weight of the monomer monool can be calculated from the molecular skeleton and the number of atoms. Further, a molecular weight of the polymer monool is determined as the molecular weight in terms of polystyrene by gel permeation chromatography measurement as a number average molecular weight. Then, the molecular weight of the monool is calculated as an average value of the molecular weight of each component.

In the alcohols, a combination ratio of the polyol to the monool is set based on a mole ratio of the amount of hydroxyl groups derived from the polyol to the amount of hydroxyl groups derived from the monool.

Specifically, from the viewpoint of improving the thermal stability, the appearance, and the chemical resistance, and in addition, improving the low-temperature curability and the colour fastness to rubbing in the application of the carbodiimide curing agent for fiber treatment (described later), the mole ratio (hydroxyl group derived from the polyol/hydroxyl group derived from the monool) of the amount of hydroxyl groups derived from the polyol to the amount of hydroxyl groups derived from the monool is, for example, 0.1 or more, preferably 0.5 or more, more preferably 0.8 or more, and below 2.0, preferably 1.8 or less, more preferably 1.5 or less, further more preferably 1.2 or less.

In other words, the polycarbodiimide composition including the carbodiimide modified product can be obtained by first reacting, as a raw material component, a straight-chain aliphatic diisocyanate with the above-described alcohols (monool and polyol) under the predetermined conditions to obtain an isocyanate group-terminated prepolymer as a reaction product, and then, further subjecting the isocyanate group-terminated prepolymer to a carbodiimidization reaction.

In such a case, when the combination ratio of the polyol to the monool is within the above-described range, a prepolymer which is appropriately high in molecular weight is obtained by the reaction of the straight-chain aliphatic diisocyanate with the alcohols (described later), and the prepolymer is carbodiimidized. Therefore, since the carbodiimide modified product is made relatively high in molecular weight, it is possible to obtain excellent thermal stability, excellent appearance, and excellent chemical resistance as compared with a case where the carbodiimide modified product has a relatively low molecule.

In the following, a method for producing a polycarbodiimide composition is described in detail.

In this method, first, the above-described straight-chain aliphatic diisocyanate and the above-described alcohols are subjected to a urethanization reaction (urethanization step).

In the urethanization step, a reaction ratio of the straight-chain aliphatic diisocyanate to the alcohols is set in accordance with the kind (molecular weight and the like) of the straight-chain aliphatic diisocyanate and the alcohols so that a carbodiimide equivalent (g/mol) of the polycarbodiimide composition as an equivalent ratio (NCO/OH) of an isocyanate group of the straight-chain aliphatic diisocyanate to a hydroxyl group of the alcohols is within a range to be described later.

More specifically, though depending on the kind of the straight-chain aliphatic diisocyanate and the alcohols, a reaction ratio of the straight-chain aliphatic diisocyanate to the alcohols as the equivalent ratio (NCO/OH) of the isocyanate group of the straight-chain aliphatic diisocyanate to the hydroxyl group of the alcohols is, for example, above 2, preferably 3 or more, more preferably 4 or more, further more preferably 5 or more, and for example, 16 or less, preferably 10 or less, more preferably below 8, further more preferably 6 or less. In other words, in the urethanization step, preferably, the reaction is carried out at a ratio at which the isocyanate group becomes excessive with respect to the hydroxyl group.

When the reaction ratio of the straight-chain aliphatic diisocyanate to the alcohols is within the above-described range, the resin cured product (described later) having excellent chemical resistance can be obtained.

In addition, in the reaction, if necessary, for example, a known urethanization catalyst such as amines and an organic metal compound may be added.

Examples of the amines include tertiary amines such as triethylamine, triethylenediamine, bis-(2-dimethylaminoethyl) ether, and N-methylmorpholine; quaternary ammonium salts such as tetraethylhydroxylammonium; and imidazoles such as imidazole and 2-ethyl-4-methylimidazole.

Examples of the organic metal compound include organic tin compounds such as tin acetate, tin octylate, tin oleate, tin laurate, dibutyltin diacetate, dimethyltin dilaurate, dibutyltin dilaurate, dibutyltin dimercaptide, dibutyltin maleate, dibutyltin dilaurate (dibutyltin dilaurate (IV)), dibutyltin dineodecanoate, dioctyltin dimercaptide, dioctyltin dilaurate, and dibutyltin dichloride; organic lead compounds such as lead octanoate and lead naphthenate; organic nickel compounds such as nickel naphthenate; organic cobalt compounds such as cobalt naphthenate, organic copper compounds such as copper octenate; and organic bismuth compounds such as bismuth octylate and bismuth neodecanoate.

Furthermore, examples of the urethanization catalyst include potassium salts such as potassium carbonate, potassium acetate, and potassium octylate.

These urethanization catalysts may be used alone or in combination of two or more.

A mixing ratio of the urethanization catalyst is not particularly limited, and is appropriately set in accordance with the purpose and the application.

Further, the reaction conditions in the urethanization step are set in accordance with the kind of the straight-chain aliphatic diisocyanate and the alcohols, the equivalent ratio (NCO/OH) described above, and the like so that the carbodiimide equivalent (g/mol) of the polycarbodiimide composition is within a range to be described later.

More specifically, as the reaction conditions in the urethanization step, for example, the reaction temperature is, for example, 30° C. or more, preferably 60° C. or more, and for example, 150° C. or less, preferably 120° C. or less under the atmosphere of a normal pressure and an inert gas (for example, nitrogen gas). Further, the reaction time is, for example, one hour or more, preferably three hours or more, and for example, 50 hours or less, preferably 40 hours or less.

Thus, the prepolymer can be obtained as the reaction product of the straight-chain aliphatic diisocyanate and the alcohols. The prepolymer has the isocyanate group at the end of the molecule (that is, the isocyanate group-terminated prepolymer).

Next, in this method, a reaction liquid containing the reaction product in the urethanization step described above is heated in the presence of a carbodiimidization catalyst to be subjected to a carbodiimidization reaction (carbodiimidization step).

The carbodiimidization catalyst is not particularly limited, and examples thereof include a trialkylphosphate ester-based compound, a phospholene oxide-based compound, a phospholene sulfide-based compound, a phosphine oxide-based compound, and a phosphine-based compound.

Examples of the trialkyl phosphate ester include trialkyl phosphate ester-based compounds having 3 to 24 carbon atoms such as trimethyl phosphate, triethyl phosphate, and trioctyl phosphate.

Examples of the phospholene oxide-based compound include phospholene oxide-based compounds having 4 to 18 carbon atoms such as 3-methyl-1-phenyl-2-phospholene-1-oxide (MPPO), 1-ethyl-3-methyl-2-phospholene-1-oxide (EMPO), 1-butyl-3-methyl-2-phospholene-1-oxide, 1-benzyl-3-methyl-2-phospholene-1-oxide, 1,3-dimethyl-2-phospholene-1-oxide, 1-phenyl-2-phospholene-1-oxide, 1-methyl-2-phospholene-1-oxide, 1-ethyl-2-phospholene-1-oxide, and double bond isomers of these.

Examples of the phospholene sulfide-based compound include phospholene sulfide-based compounds having 4 to 18 carbon atoms such as 1-phenyl-2-phospholene-1-sulfide.

Examples of the phosphine oxide-based compound include phosphine oxide-based compounds having 3 to 21 carbon atoms such as triphenylphosphine oxide and tri-tolylphosphine oxide.

Examples of the phosphine-based compound include phosphine-based compounds having 3 to 30 carbon atoms such as bis(oxadiphenylphosphino) ethane.

These carbodiimidization catalysts may be used alone or in combination of two or more.

As the carbodiimidization catalyst, preferably, a phospholene oxide-based compound is used, more preferably, a 3-methyl-1-phenyl-2-phospholene-1-oxide and a 1-ethyl-3-methyl-2-phospholene-1-oxide are used.

When the above-described carbodiimidization catalyst is used, activity of the carbodiimidization can be improved, the reaction temperature can be lowered, and side reactions such as uretonimination can be suppressed to obtain the polycarbodiimide composition in good yield, and also, the content of the carbodiimide group can be improved.

From the viewpoint of obtaining the resin cured product (described later) having excellent water resistance, and in addition, from the viewpoint of improving the low-temperature curability and the colour fastness to rubbing in the application of the carbodiimide curing agent for fiber treatment (described later), as the carbodiimidization catalyst, particularly preferably, a 3-methyl-1-phenyl-2-phospholene-1-oxide is used.

A mixing ratio of the carbodiimidization catalyst with respect to 100 parts by mass of the straight-chain aliphatic diisocyanate (straight-chain aliphatic diisocyanate used in the urethanization step) is, for example, 0.01 parts by mass or more, preferably 0.05 parts by mass or more, and for example, 20 parts by mass or less, preferably 10 parts by mass or less.

In addition, the reaction conditions in the carbodiimidization step are set so that a content ratio (carbodiimide equivalent) of the carbodiimide group of the obtained polycarbodiimide composition is within a specific range to be described later. More specifically, from the viewpoint of achieving progress of the carbodiimidization reaction and reducing uretonimine, the reaction temperature is, for example, 125° C. or more, preferably 130° C. or more, more preferably 135° C. or more, and for example, 180° C. or less, preferably 170° C. or less, more preferably 160° C. or less under the atmosphere of a normal pressure and an inert gas (nitrogen gas and the like). Further, the reaction time is, for example, one hour or more, preferably three hours or more, and for example, 50 hours or less, preferably 40 hours or less.

By reacting under such conditions, the reaction product (isocyanate group-terminated prepolymer) obtained in the urethanization step can be decarboxylated and condensed via the isocyanate group to efficiently generate the carbodiimide group.

More specifically, when the reaction temperature is the above-described lower limit or more, the carbodiimidization reaction can proceed, while the reaction in which the generated uretonimine is decomposed into a carbodiimide and an isocyanate group is promoted. When the reaction temperature is below the above-described lower limit, this thermal decomposition reaction is quite unlikely to occur, and the content of the uretonimine increases, and the content ratio of the carbodiimide group decreases. In addition, there may be a case where the molecular weight due to an increase in the uretonimine increases and the reaction liquid is solidified. On the other hand, when the reaction temperature is the above-described upper limit or less, a polymerization loss can be reduced. When the reaction temperature is above the above-described upper limit, a polymerization reaction other than carbodiimidization and uretonimination is promoted, and not only the content of the carbodiimide group decreases but also the reaction liquid tends to be solidified due to an increase in molecular weight.

Further, in the carbodiimidization step, from the viewpoint of smoothly carrying out a carbodiimidization reaction and promoting decarboxylation condensation, preferably, the reaction liquid is refluxed in the presence of an organic solvent. That is, the carbodiimidization reaction is carried out under reflux.

Examples of the organic solvent include ketones such as acetone, methyl ethyl ketone, methyl isobutyl ketone, and cyclohexanone; nitriles such as acetonitrile; alkyl esters such as methyl acetate, ethyl acetate, butyl acetate, isobutyl acetate, and amyl acetate; aliphatic hydrocarbons such as n-hexane, n-heptane, and octane; alicyclic hydrocarbons such as cyclohexane and methyl cyclohexane; aromatic hydrocarbons such as toluene, xylene, and ethylbenzene; glycol ether esters such as methyl cellosolve acetate, ethyl cellosolve acetate, methyl carbitol acetate, ethyl carbitol acetate, ethylene glycol methyl ether acetate, ethylene glycol ethyl ether acetate, propylene glycol monomethyl ether acetate (PMA), 3-methyl-3-methoxybutyl acetate, and ethyl-3-ethoxypropionate; ethers such as diethyl ether, tetrahydrofuran, dioxane, 1,2-dimethoxyethane, diethylene glycol dimethyl ether, diethylene glycol diethyl ether, dipropylene glycol dimethyl ether, dipropylene glycol diethyl ether, and ethylene glycol diethyl ether-1,2-diethoxyethane; halogenated aliphatic hydrocarbons such as methyl chloride, methylene chloride, chloroform, carbon tetrachloride, methyl bromide, methylene iodide, and dichloroethane; and polar aprotons such as N-methyl pyrrolidone, dimethylformamide, N,N'-dimethylacetamide, dimethyl sulfoxide, and hexamethylphosphonylamide. These organic solvents may be used alone or in combination of two or more.

As the organic solvent, preferably, an organic solvent having the temperature at the time of reflux within the range of the reaction temperature described above is used.

Specifically, examples of the organic solvent include xylene, ethylene glycol methyl ether acetate, and propylene glycol methyl ether acetate.

A mixing ratio of the organic solvent is not particularly limited, and from the viewpoint of obtaining the resin cured product (described later) having excellent appearance, and in addition, improving the low-temperature curability and the colour fastness to rubbing in the application of the carbodiimide curing agent for fiber treatment (described later), the mixing ratio of the organic solvent with respect to 100 parts by mass of the straight-chain aliphatic diisocyanate (straight-chain aliphatic diisocyanate used in the urethanization step) is, for example, 50 parts by mass or more, preferably 100 parts by mass or more, and for example, 2000 parts by mass or less, preferably 500 parts by mass or less.

By refluxing the reaction liquid in the presence of the organic solvent, it is possible to smoothly carry out the carbodiimidization reaction, while the decomposition reaction of the uretonimine is promoted, and also, since it is possible to separate a carbon dioxide gas generated with the carbodiimidization of the isocyanate group, the carbodiimidization can be promoted.

Then, by such a method, the carbodiimide modified product containing the urethane group and the carbodiimide group, and optionally containing the uretonimine group is obtained.

More specifically, first, in the urethanization step, the urethane group derived from the isocyanate group of the straight-chain aliphatic diisocyanate is generated.

Then, when the reaction product (isocyanate group-terminated prepolymer) obtained in the urethanization step is heated in the carbodiimidization step, the carbodiimide group derived from the isocyanate group at the end of the molecule is generated, and optionally, a part of the generated carbodiimide group reacts with the isocyanate group at the end of the molecule to generate the uretonimine group. The uretonimine group is thermally decomposed by continuing heating in the carbodiimidization step, the carbodiimide group and the isocyanate group at the end of the molecule are regenerated, and furthermore, the carbodiimide group derived from the isocyanate group at the end of the molecule is generated.

In this way, the isocyanate group of the straight-chain aliphatic diisocyanate is converted into the urethane group and the carbodiimide group (furthermore, optionally, the uretonimine group).

As a result, the carbodiimide modified product containing the urethane group and the carbodiimide group, and optionally, containing the uretonimine group is obtained.

In addition, the polycarbodiimide composition containing the carbodiimide modified product as a main component is obtained. Further, the polycarbodiimide composition can also contain an unreacted straight-chain aliphatic diisocyanate as an auxiliary component. A content ratio of the straight-chain aliphatic diisocyanate is appropriately set within a range as long as the excellent effect of the present invention is not damaged.

In addition, in this method, if necessary, the polycarbodiimide composition obtained in the above-described carbodiimidization step and the alcohols can be further reacted. In the following, the urethanization step before the carbodiimidization step may be referred to as the first urethanization step, and the urethanization step after the carbodiimidization step may be referred to as the second urethanization step.

Specifically, when the polycarbodiimide composition obtained in the carbodiimidization step further has the isocyanate group at the end of the molecule, the isocyanate group at the end of the molecule can be urethanized by reacting the polycarbodiimide composition with the alcohols.

When the second urethanization step is carried out, there may be a case where by-products derived from the alcohols are increased and a molecular weight is rapidly increased to decrease flowability, resulting in a decrease in workability or a decrease in dispersibility in the aqueous dispersion composition. Therefore, preferably, the second urethanization step is not carried out, and only the first urethanization step and the carbodiimidization step are carried out.

The method for producing a polycarbodiimide composition is not limited to the description above, and for example, the straight-chain aliphatic diisocyanate, the carbodiimidization catalyst, and the alcohols can be also collectively blended and heated.

Further, if necessary, for example, an unreacted straight-chain aliphatic diisocyanate, unreacted alcohols, a low molecular weight compound (by-product), the organic solvent, the carbodiimidization catalyst, the urethanization catalyst, and the like can also be removed from the polycarbodiimide composition by a known method such as distillation, extraction, and filtration.

Furthermore, if necessary, a known additive can be further added to the polycarbodiimide composition at an appropriate timing. Examples thereof include storage stabilizers (o-toluenesulfonamide, p-toluenesulfonamide, and the like), plasticizers, anti-blocking agents, heat-resistant stabilizers, light-resistant stabilizers, antioxidants, mold release agents, catalysts, pigments, surface modifiers, dispersants, dyes, lubricants, fillers, and antihydrolysis agents. An addition ratio of the additive is not particularly limited, and is appropriately set in accordance with the purpose and the application.

Further, these polycarbodiimide compositions may be used alone or in combination of two or more.

A carbodiimide equivalent (g/mol) of the polycarbodiimide composition thus obtained is 300 or more, preferably 350 or more, more preferably 400 or more, further more preferably 410 or more, particularly preferably 430 or more, and 550 or less, preferably 530 or less, more preferably 500 or less, further more preferably 480 or less, particularly preferably 460 or less.

The carbodiimide equivalent (g/mol) is measured by $^{13}$C-NMR in conformity with Examples to be described later.

Although the carbodiimide equivalent (g/mol) may be calculated from a charging ratio, a measured value by $^{13}$C-NMR is used.

Further, since the polycarbodiimide composition uses the alcohols including the polyol and the monool at a predetermined ratio, the polycarbodiimide composition has a higher molecular weight, and a lower molecular weight product therein is reduced as compared with the polycarbodiimide composition using only the monool.

Specifically, in chromatogram obtained when the polycarbodiimide composition is measured by gel permeation chromatography, an area ratio of the peak area having a molecular weight of 500 or less in terms of polystyrene to the total peak area is, from the viewpoint of improving the thermal stability, the chemical resistance, and the appearance, and in addition, improving excellent colour fastness to rubbing in the application of the carbodiimide curing agent for fiber treatment (described later), for example, 7.0% or less, preferably 6.5% or less, more preferably 6.0% or less, further more preferably 5.0% or less, particularly preferably 4.5% or less.

Further, in chromatogram obtained when the polycarbodiimide composition is measured by gel permeation chromatography, an area ratio of the peak area having a molecular weight of 1000 or less in terms of polystyrene to the total peak area is, from the viewpoint of improving the thermal stability, the chemical resistance, and the appearance, and in addition, improving excellent colour fastness to rubbing in the application of the carbodiimide curing agent for fiber treatment (described later), for example, 12.0% or less, preferably 10.0% or less, more preferably 9.0% or less, further more preferably 8.0% or less, particularly preferably 7.0% or less.

The area ratio can be calculated as an area ratio in the chromatogram (chart) obtained by measuring the molecular weight distribution of an isocyanurate derivative of a pentamethylene diisocyanate by gel permeation chromatograph (GPC) equipped with a differential refractive index detector (RID) in conformity with Examples to be described later. The area ratio of the peak area having a molecular weight of 500 or less and the area ratio of the peak area having a molecular weight of 1000 or less are based on a calibration curve of the standard polystyrene.

Then, when the area ratio of the peak area having a molecular weight of 500 or less is within the above-described range and the area ratio of the peak area having a molecular weight of 1000 or less is within the above-described range, it is possible to improve the appearance, the chemical resistance, and the thermal stability, among all, to improve the appearance of the resin cured product (described later), and in addition, it is possible to improve the low-temperature curability and the colour fastness to rubbing in the application of the carbodiimide curing agent for fiber treatment (described later).

Then, in the polycarbodiimide composition, since the alcohols of the raw material component include the polyol and the monool at a predetermined ratio, the carbodiimide modified product is increased in molecular weight as compared with a case where the alcohols do not include the polyol. Specifically, the prepolymer is obtained by reaction of the straight-chain aliphatic diisocyanate with the alcohols including the polyol, and since the prepolymer is carbodiimidized, the carbodiimide modified product having a relatively high molecular weight is obtained. As a result, the resin cured product (described later) having excellent chemical resistance can be obtained from the polycarbodiimide composition.

On the other hand, when the carbodiimide modified product is excessively increased in molecular weight, it may tend to be thickened and inferior in the thermal stability. On the other hand, in the polycarbodiimide composition of the present invention, since the ratio of the polyol and the monool is adjusted, the carbodiimide composition stays appropriately high in molecular weight and also has excellent thermal stability.

Furthermore, in the above-described polycarbodiimide composition, since the carbodiimide equivalent is adjusted to a predetermined ratio, the resin cured product (described later) having excellent appearance and excellent chemical resistance can be obtained.

In other words, the above-described polycarbodiimide composition has excellent thermal stability, and furthermore, the resin cured product (described later) having excellent appearance and excellent chemical resistance can be obtained.

Further, according to the method for producing a polycarbodiimide composition described above, the polycarbodiimide composition can be efficiently produced.

Then, since the polycarbodiimide composition has excellent thermal stability, and furthermore, the resin cured product having excellent appearance and excellent chemical resistance can be obtained, it is preferably used as a curing agent in the resin composition.

The resin composition includes the curing agent containing the polycarbodiimide composition and a main agent having a carboxyl group.

The curing agent is not particularly limited as long as it includes the polycarbodiimide composition, and is prepared as, for example, an aqueous dispersion solution (hereinafter, referred to as an aqueous dispersion composition) in which the polycarbodiimide composition is dispersed in water, a solution (hereinafter, referred to as a solution composition) in which the polycarbodiimide composition is dissolved in an organic solvent, and the like.

The aqueous dispersion composition contains the polycarbodiimide composition and water.

A method of dispersing the polycarbodiimide composition in water is not particularly limited, and examples thereof include a method of adding water to the polycarbodiimide composition and stirring the mixture, and a method of adding the polycarbodiimide composition to water and stirring the mixture. Preferably, water is added to the polycarbodiimide composition.

A ratio of the polycarbodiimide composition to water is not particularly limited, and the concentration (that is, the solid content concentration) of the polycarbodiimide composition (resin component) in the aqueous dispersion composition is, for example, 5% by mass or more, preferably 10% by mass or more, and for example, 90% by mass or less, preferably 80% by mass or less.

When the curing agent is the aqueous dispersion composition, miscibility with an aqueous resin (main agent) can be improved, and the cured product having excellent appearance and excellent chemical resistance can be obtained. Further, since the aqueous dispersion composition contains the above-described polycarbodiimide composition, it has excellent thermal stability.

The solution composition includes the polycarbodiimide composition and the organic solvent.

Examples of the organic solvent include the organic solvent described above, and preferably, methyl ethyl ketone, methyl isobutyl ketone, ethyl acetate, butyl acetate, toluene, and xylene are used.

Further, a solvent used in the carbodiimidization step may be used as the organic solvent of the solution composition. For example, the solvent used in the carbodiimidization step can be also used as the organic solvent of the solution composition as it is without distillation.

The method of dissolving the polycarbodiimide composition in the organic solvent is not particularly limited, and examples thereof include a method of adding the organic solvent to the polycarbodiimide composition and stirring the mixture, and a method of adding the polycarbodiimide composition to the organic solvent and stirring the mixture. Preferably, the organic solvent is added to the polycarbodiimide composition.

A ratio of the polycarbodiimide composition to the organic solvent is not particularly limited, and the concentration (that is, the solid content concentration) of the polycarbodiimide composition (resin component) in the solution composition is, for example, 5% by mass or more, preferably 10% by mass or more, and for example, 90% by mass or less, preferably 80% by mass or less.

When the curing agent is the solution composition, the miscibility with an oil-based resin (main agent) can be improved, and the cured product having excellent appearance and excellent chemical resistance can be obtained. Further, the solution composition has excellent thermal stability.

Examples of the main agent having a carboxyl group include an aqueous resin having a carboxyl group and an oil-based resin having a carboxyl group.

An example of the aqueous resin having a carboxyl group includes a hydrophilic polymer having a carboxyl group, and specifically, examples thereof include a hydrophilic polyester resin having a carboxyl group, a hydrophilic polyamide resin having a carboxyl group, a hydrophilic polyurethane resin having a carboxyl group (hydrophilic polyurethane polyol), a hydrophilic acrylic resin having a carboxyl group (hydrophilic acrylic polyol), and a hydrophilic polyolefin resin (for example, polypropylene, polyethylene, polypropylene-polyethylene (random/block) copolymer, and another polyolefin having 4 or more carbon atoms of a repeating unit) having a carboxyl group. These aqueous resins having a carboxyl group may be used alone or in combination of two or more.

As the aqueous resin having a carboxyl group, preferably, a hydrophilic polyurethane resin having a carboxyl group (hydrophilic polyurethane polyol) and a hydrophilic acrylic resin having a carboxyl group (hydrophilic acrylic polyol) are used.

An example of the oil-based resin having a carboxyl group includes a hydrophobic polymer having a carboxyl group, and specifically, examples thereof include a hydrophobic polyester resin having a carboxyl group, a hydrophobic polyamide resin having a carboxyl group, a hydrophobic polyurethane resin having a carboxyl group (hydrophobic polyurethane polyol), a hydrophobic acrylic resin having a carboxyl group (hydrophobic acrylic polyol), and a hydrophobic polyolefin (for example, polypropylene, polyethylene, polypropylene-polyethylene (random/block) copolymer, and another polyolefin having 4 or more carbon atoms of a repeating unit) having a carboxyl group. These oil-based resins having a carboxyl group may be used alone or in combination of two or more.

As the oil-based resin having a carboxyl group, preferably, a hydrophobic polyurethane resin having a carboxyl group (hydrophobic polyurethane polyol) and a hydrophobic acrylic resin having a carboxyl group (hydrophobic acrylic polyol) are used.

They may be used alone or in combination of two or more.

As the main agent and the curing agent, preferably, a combination in which the main agent is the aqueous resin and the curing agent is the aqueous dispersion composition is used. Or, preferably, a combination in which the main agent is the oil-based resin and the curing agent is the solution composition is also used.

As the resin composition, from the viewpoint of reducing the organic solvent and protecting the global environment, a combination of the aqueous main agent and the aqueous dispersion composition is preferably used.

Further, the resin composition is not particularly limited as long as it includes the above-described main agent and the above-described curing agent, and the resin composition may be a two liquid-type in which the main agent and the curing agent are individually prepared and mixed at the time of its use, and may be a one liquid-type in which the main agent and the curing agent are mixed in advance.

As the resin composition, preferably, a two liquid-type resin composition is used.

As a content ratio of the main agent and the curing agent, a ratio of the main agent with respect to 100 parts by mass of the total amount of these is, for example, 10 parts by mass or more, preferably 30 parts by mass or more, and for example, 99.5 parts by mass or less, preferably 95.0 parts by mass or less. Further, a ratio of the curing agent with respect to 100 parts by mass of the total amount of these is, for example, 0.5 parts by mass or more, preferably 5 parts by mass or more, and for example, 90 parts by mass or less, preferably 70 parts by mass or less.

Further, a mole ratio of the carbodiimide group in the curing agent to the carboxyl group in the main agent is, for example, 0.1 or more, preferably 0.2 or more, more preferably 0.5 or more, and for example, 2.5 or less, preferably 2.0 or less, more preferably 1.5 or less.

In addition, if necessary, an additive may be blended with any one of or both of the main agent and the curing agent. Example of the additive include epoxy resins, catalysts (urethanization catalysts and the like), coating improvers, leveling agents, viscosity modifiers, defoaming agents, stabilizers such as an antioxidant and an ultraviolet absorber, plasticizers, surfactants, pigments, surface modifiers, dispersants, fillers, organic or inorganic fine particles, antifungal agents, and silane coupling agents. A mixing amount of the additive is appropriately determined in accordance with the purpose and the application.

Further, as the main agent, the aqueous resin having a carboxyl group described above and/or the oil-based resin having a carboxyl group described above and another resin (for example, hydroxyl group-containing polyurethane resin, hydroxyl group-containing acrylic resin, hydroxyl group-containing polyester resin, and the like) can be also used in combination.

Further, as the curing agent, the above-described polycarbodiimide composition and another curing agent (for example, polyisocyanate-based resin (block polyisocyanate and the like), epoxy-based resin, melamine resin, and the like) can be also used in combination.

Then, in the resin composition, since the above-described polycarbodiimide composition is used as a curing agent, the resin cured product having excellent thermal stability, excellent appearance, and excellent chemical resistance can be obtained.

The method of producing the resin cured product is not particularly limited, and for example, when the resin composition is the one liquid-type, the resin composition is applied as it is to an object to be coated or an adherend. In addition, when the resin composition is the two liquid-type, the main agent and the curing agent are mixed, and the obtained mixture is applied to the object to be coated or the adherend. Then, by heating and curing the resin composition, the resin cured product is obtained.

In the above-described resin composition, the curing temperature is relatively low, and specifically, is, for example, 100° C. or less, preferably 80° C. or less. Further, the curing temperature is, for example, 20° C. or more, preferably 30° C. or more.

In addition, the curing time is relatively short, and specifically, is, for example, one hour or less, preferably 30 minutes or less. Further, the curing time is, for example, one minute or more, preferably five minutes or more.

Further, if necessary, the resin cured product which is heated and cured can be further dried.

In such a case, the drying temperature may be room temperature, and is, for example, 10° C. or more, preferably 15° C. or more, and for example, 40° C. or less, preferably 30° C. or less.

Further, the drying time is, for example, one minute or more, preferably five minutes or more, and for example, two hours or less, preferably one hour or less.

Then, since the obtained resin cured product is the cured product of the resin composition having excellent thermal stability, it has excellent productivity, and further, has excellent appearance and excellent chemical resistance.

Further, since the polycarbodiimide composition is obtained using the straight-chain aliphatic diisocyanate, the resin cured product obtained using the polycarbodiimide composition also has excellent light resistance (weather resistance).

Therefore, the resin composition and the resin cured product are preferably used in various fields such as coating materials, adhesive materials (adhesives), pressure-sensitive adhesive materials (pressure-sensitive adhesives), inks, sealants, molding materials, foams, optical materials, furthermore, resin modifiers for modifying a resin such as polyester, polylactic acid, polyamide, polyimide, and polyvinyl alcohol, textile printing treatment agents, and fiber treatment agents.

When the resin composition and the resin cured product are used as a coating material, examples thereof include paints for plastics, paints for exteriors of automobiles, paints for interiors of automobiles, paints for electrical and electronic materials, paints for optical materials (lenses and the like), paints for building materials, glass coating paints, wood paints, paints for film coating, ink paints, paints (coating agents) for artificial and synthetic leather, paints (coating agents) for cans, paper coating paints, and thermosensitive paper coating paints.

Examples of the paint for plastics described above include paints for molded products using a plastic material (for example, various polymer materials such as polyolefins, ABS, polycarbonates, polyamides, polyesters, and complexes of these), specifically, paints for casing (mobile phones, smartphones, PCs, tablets, and the like), paints for automobile components (interior materials of automobiles, head lamps, and the like), paints for household electrical appliances, paints for robot materials, paints for furniture, paints for stationery, paints for flexible materials such as rubber, elastomers, and gels, paints for eyewear materials (lenses and the like), and paints for optical lenses of electronic devices (surface coating agents).

Examples of the film coating paint described above include paints for optical members (optical films, optical sheets, and the like), coating materials for optics, paints for fibers, paints for electronic and electrical materials, paints for food packages, paints for medical films, paints for cosmetics packages, paints for decorative films, and paints for release films.

Examples of the adhesive include adhesives for packaging, adhesives for electrical devices, adhesives for liquid crystal displays (LCD), adhesives for organic EL displays, adhesives for organic EL lighting, adhesives for display devices (electronic paper, plasma displays, and the like), adhesives for LEDs, adhesives for interiors and exteriors of automobiles, adhesives for household electrical appliances, adhesives for building materials, adhesives for solar cell back sheets, and adhesives for various batteries (lithium ion batteries and the like).

Further, examples of the ink paint described above include vehicles of various inks (plate ink, screen ink, flexographic ink, gravure ink, jet ink, textile printing ink, and the like).

In addition, in the field of the fiber treatment agent, the above-described polycarbodiimide composition is, for example, used as a carbodiimide cross-linking agent for fiber treatment.

The carbodiimide cross-linking agent for fiber treatment is a cross-linking agent (cross-linking agent for textile printing) used for textile printing on fibers or leather. In the following, the carbodiimide cross-linking agent for fiber treatment may be simply referred to as a cross-linking agent.

The cross-linking agent includes the polycarbodiimide composition described above, and preferably, the cross-linking agent consists of the polycarbodiimide composition described above.

The carbodiimide cross-linking agent for fiber treatment is not particularly limited as long as it includes the polycarbodiimide composition, and is, for example, prepared as an aqueous dispersion solution in which the polycarbodiimide composition is dispersed in water (aqueous dispersion composition described above), and a solution in which the polycarbodiimide composition is dissolved in an organic solvent (solution composition described above). As the carbodiimide cross-linking agent for fiber treatment, preferably, an aqueous dispersion composition of the polycarbodiimide composition is used.

Then, since the carbodiimide cross-linking agent for fiber treatment includes the above-described polycarbodiimide composition, it is possible to improve the colour fastness to rubbing at the time of the textile printing treatment at a relatively low temperature (120° C. or less).

More specifically, the carbodiimide cross-linking agent for fiber treatment is preferably used as an ink raw material for textile printing for textile printing treatment of fibers.

The ink raw material for textile printing includes the above-described cross-linking agent as a polyisocyanate component and a main agent having a carboxyl group.

Examples of the main agent having a carboxyl group include the aqueous resin having a carboxyl group described above and the oil-based resin having a carboxyl group described above.

As the main agent and the cross-linking agent, preferably, a combination in which the main agent is the aqueous resin and the cross-linking agent is the aqueous dispersion composition is used. Preferably, a combination in which the main agent is the oil-based resin and the cross-linking agent is the solution composition is also used.

From the viewpoint of reducing the organic solvent and protecting the global environment, preferably, a combination of the aqueous main agent and the aqueous dispersion composition is used.

Then, an ink for textile printing is prepared from the two component-system ink raw material for textile printing (main agent and cross-linking agent).

The ink raw material for textile printing is not particularly limited as long as it contains the above-described main agent and the above-described cross-linking agent. The ink raw material for textile printing may be a two liquid-type in which the main agent and the cross-linking agent are individually prepared and mixed at the time of its use, and may be a one liquid-type in which the main agent and the cross-linking agent are mixed in advance.

As the ink raw material for textile printing, preferably, a two liquid-type ink raw material for textile printing is used.

As a content ratio of the main agent and the cross-linking agent, in terms of solid content, a ratio of the main agent with respect to 100 parts by mass of the total amount of these is, for example, 10 parts by mass or more, preferably 30 parts by mass or more, and for example, 99.5 parts by mass or less, preferably 95.0 parts by mass or less. Further, a ratio of the cross-linking agent with respect to 100 parts by mass of the total amount of these is, for example, 0.5 parts by mass or more, preferably 5 parts by mass or more, and for example, 90 parts by mass or less, preferably 70 parts by mass or less.

Further, a mole ratio of the carbodiimide group in the cross-linking agent to the carboxyl group in the main agent is, for example, 0.1 or more, preferably 0.2 or more, more preferably 0.5 or more, and for example, 2.5 or less, preferably 2.0 or less, more preferably 1.5 or less.

In addition, a pigment is preferably blended into any one of or both of the cross-linking agent and the main agent. The pigment is not particularly limited, and examples thereof include a blue pigment, a white pigment, and a black pigment.

A mixing ratio of the pigment with respect to the total sum of the cross-linking agent, the main agent, and the pigment is, for example, 1% by mass or more, preferably 10% by mass or more, and for example, 40% by mass or less, preferably 30% by mass or less.

In addition, if necessary, an additive may be blended with any one of or both of the cross-linking agent and the main agent. Example of the additive include epoxy resins, catalysts (urethanization catalysts and the like), coating improvers, leveling agents, viscosity modifiers, defoaming agents, stabilizers such as an antioxidant and an ultraviolet absorber, plasticizers, surfactants, surface modifiers, dispersants, fillers, organic or inorganic fine particles, antifungal agents, and silane coupling agents. A mixing amount of the additive is appropriately determined in accordance with the purpose and the application.

Further, as the main agent, the aqueous resin having a carboxyl group described above and/or the oil-based resin having a carboxyl group described above and another resin (for example, hydroxyl group-containing polyurethane resin, hydroxyl group-containing acrylic resin, hydroxyl group-containing polyester resin, and the like) can be used in combination.

Further, as the cross-linking agent, the above-described polycarbodiimide composition and another cross-linking agent (for example, polyisocyanate-based resin (block polyisocyanate and the like), epoxy-based resin, melamine resin, and the like) can be also used in combination.

Then, the ink for textile printing is imprinted (printed) on an object to be printed with a known textile printing device (for example, ink jet device and the like), and then, if necessary, is subjected to heat treatment to be cured.

Examples of the object to be printed include fibers, and more specifically, fabrics, leather, and the like are used.

The fiber of the fabric is not particularly limited, and examples thereof include natural fibers (for example, silk, cotton, hemp, and the like) and synthetic fibers (for example, nylon, polyester, rayon, and the like). The form of the fabric is not particularly limited, and examples thereof include a woven fabric, a knitted fabric, and a nonwoven fabric. The leather is not particularly limited, and examples thereof include natural leather and artificial leather.

The heating temperature is relatively low, and more specifically, is 120° C. or less, preferably 100° C. or less, further more preferably 80° C. or less. The heating temperature is usually 5° C. or more, more preferably 20° C. or more.

Thus, the ink cured product (cured coating film, polyurethane resin) is formed. Since the obtained ink cured product is formed from the above-described ink for textile printing, it has excellent low-temperature curability and excellent colour fastness to rubbing.

The application of the polycarbodiimide composition is not limited to the description above, and the polycarbodiimide composition can be preferably used as a solid hydrolysis-resistant inhibitor with respect to a polyester-based resin, a polyamide-based resin, and a polyactic acid; a liquid hydrolysis-resistant inhibitor with respect to a polyester polyol; a complex material with respect to an acid-modified polyolefin (maleic acid-modified polyolefin and the like), a polyolefin-based emulsion in which an acid-modified polyolefin is water-dispersed, and an acrylic emulsion including an acid site; a convergent material of various fibers (carbon fiber, glass fiber, and the like); a reinforcing material of a fiber-reinforced plastic (CFRP, FRP, and the like); furthermore, a sizing agent; and a curing agent.

EXAMPLES

Next, the present invention is described based on Production Examples, Examples, and Comparative Examples. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

<IR Spectrum>

The completion of a carbodiimidization reaction in a method for producing a polycarbodiimide composition was confirmed by measuring an IR spectrum in the following device and conditions.

IR measurement device: Frontier FT-IR manufactured by PerkinElmer Japan Co., Ltd.

Measurement method: ATR (reflection method)

Frequency range: 4000 to 400 $cm^{-1}$

Resolution: 4 $cm^{-1}$

<Carbodiimide Equivalent of Polycarbodiimide Composition (g/mol)>

A carbodiimide equivalent of the polycarbodiimide composition was determined from the result of $^{13}$C-NMR measurement as a measured value. Further, as a reference value, a calculated value of the carbodiimide equivalent from a charging amount was obtained.

In other words, $^{13}$C-NMR was measured by the following device and conditions, and a content ratio of a uretonimine group with respect to 1 mol of the total sum of a carbodiimide group, the uretonimine group, an allophanate group, and a urethane group was calculated by the following formula. As a reference of chemical shift ppm, a tetramethylsilane (0 ppm) in a $CDCL_3$ solvent was used.

Device: ECA-500 type (manufactured by JEOL Ltd.)

Conditions: measurement frequency: 125 MHz, solvent: $CDCL_3$, solute concentration: 50% by mass Measurement temperature: room temperature, number of scans: 8500 times Repetition time: 3.0 seconds, pulse width: 30° (3.70 μseconds)

Assignment peak of carbon of carbodiimide group (N=C=N group in the carbodiimide group): 139 ppm Assignment peak of carbon of uretonimine group (C=O group, C=N group in the uretonimine group): 159 ppm, 145 ppm Assignment peak of carbon of allophanate group (C=O group in the allophanate group): 154 ppm Assignment peak of carbon of urethane group (C=O group in the urethane group): 156 ppm (Carbodiimide equivalent)={(weight of charged solid content)−(mole ratio of generated carbon dioxide to urethane group)×(mole number of charged total alcohol)×44.01}/{(mole ratio of carbodiimide group to urethane group)×(mole number of charged total alcohol)}

The mole ratio of the generated carbon dioxide to the urethane group and the mole ratio of the carbodiimide group to the urethane group were calculated as follows.

(Mole ratio of generated carbon dioxide to urethane group)={(integrated value of carbodiimide group)+(integrated value of uretonimine group)}/{(integrated value of urethane group)+(integrated value of allophanate group)}

(Mole ratio of carbodiimide group to urethane group)=(integrated value of carbodiimide group)/{(integrated value of urethane group)+(integrated value of allophanate group)}

<Area Ratio>

By chromatogram obtained under the following GPC measurement conditions by gel permeation chromatograph (GPC) equipped with a differential refractive index detector (RID), a ratio of the peak area having a molecular weight of 500 or less in terms of polystyrene to the total peak area and a ratio of the peak area having a molecular weight of 1000 or less in terms of polystyrene to the total peak area were determined.

The GPC chromatogram of the polycarbodiimide composition obtained in Example 1 to be described later is shown in FIG. 1. In addition, in the figure, the peak number/the retention time/the molecular weight of the peak top are also shown.

Device: HLC-8320GPC (manufactured by Tosoh Corporation)

Column: LF-804 (trade name: Shodex), three connected in series

Column temperature: 40° C.

Eluent: tetrahydrofuran

Flow rate: 1.0 mL/min

Detection method: differential refractive index

Reference material: standard polystyrene

Production Example 1 (Production of Pentane Diisocyanate)

In the same procedure as in Example 1 in International Publication WO2012/121291, 99.9% by mass of 1,5-pentane diisocyanate (hereinafter, may be abbreviated as PDI) was obtained.

Production Example 2 (Production of Polyoxyethylene-Polyoxypropylene Monomethyl Ether)

By using a dipropylene glycol monomethyl ether as an initiator and a potassium hydroxide (hereinafter, KOH) as a catalyst, these alkylene oxides (ethylene oxide and propylene oxide) were subjected to random addition polymerization at the temperature of 110° C. and the maximum reaction pressure of 0.4 MPa gauge (G) until 102 mgKOH/g of the hydroxyl value (hereinafter, OHV) so that a mass ratio of the ethylene oxide to the propylene oxide in the polyol was 50:50, thereby preparing a crude polyol.

Then, under a nitrogen atmosphere, ion-exchanged water was added with respect to the crude polyol heated at 80° C., and 1.05 equivalent of phosphoric acid (in the form of 75.2% by weight of aqueous solution) was added with respect to KOH, and the mixture was subjected to a neutralization reaction at 80° C. for two hours.

Then, reduced pressure dehydration was started, while raising the temperature, and an adsorbent was added thereto at the time of 40 kPa of the pressure. Finally, the mixture was subjected to heat decompression treatment for three hours under the conditions of 105° C. and 1.33 kPa or less.

Thereafter, the obtained product was subjected to filtration, thereby obtaining a polyoxyethylene-polyoxypropylene monomethyl ether.

A ratio (hereinafter, referred to as an EO ratio) of an oxyethylene group to the total amount of the oxyethylene group and an oxypropylene group in the polyoxyethylene-polyoxypropylene monomethyl ether was 50% by mass. Further, a number average molecular weight measured by gel permeation chromatography was 550.

The polyoxyethylene-polyoxypropylene monomethyl ether (EO ratio of 50% by mass, molecular weight of 550) was referred to as a monool A.

Example 1

Production of Polycarbodiimide Composition

A four-necked flask equipped with a stirrer, a thermometer, a reflux tube, and a nitrogen introduction tube was charged with 100.0 parts by mass of pentamethylene diisocyanate (PDI) obtained in Production Example 1, 16.2 parts by mass of PTG-250 (polytetramethylene ether glycol, molecular weight of 250), and 71.4 parts by mass of monool A (polyoxyethylene-polyoxypropylene monomethyl ether (EO ratio of 50% by mass, molecular weight of 550) obtained in Production Example 2) at room temperature. While introducing nitrogen, the mixture was heated at 80° C. under a normal pressure and stirred for four hours (urethanization step).

Subsequently, 758.3 parts by mass of propylene glycol monomethyl ether acetate (PMA) and 2.0 parts by mass of 3-methyl-1-phenyl-2-phospholene-1-oxide (MPPO) were charged and stirred under reflux (at 150° C.) (carbodiimidization step). The completion of the reaction was confirmed by infrared absorption (IR) spectroscopy which showed that the absorption peak around 2260 cm$^{-1}$ derived from stretching vibrations of isocyanate groups almost disappeared.

After the completion of the reaction, the mixture was cooled to 80° C., and PMA was distilled off under a reduced pressure until a residual ratio of PMA was 2% or less to obtain a polycarbodiimide composition. The obtained polycarbodiimide composition was measured by $^{13}$C-NMR, and as a result, a carbodiimide equivalent was 450 g/mol (calculated value was 317 g/mol).

Further, a part of the obtained polycarbodiimide composition was taken out, the E-type viscosity at 25° C. thereof was measured, and as a result, the value was 4000 mPa·s.

Preparation of Aqueous Dispersion (Aqueous Dispersion Composition) of Polycarbodiimide Composition The polycarbodiimide composition was put in a flask, and distilled water was gradually added so as to have a resin solid content of 40%, and stirred to obtain an aqueous dispersion of the polycarbodiimide composition.

Preparation of Aqueous Resin Composition

The obtained aqueous dispersion of the polycarbodiimide composition was used as a curing agent. A polyurethane dispersion (solid content of 30% by mass, carboxyl group equivalent of solid content of 1122 g/mol) was used as a main agent, and the curing agent and the main agent were mixed so that the equivalent ratio of the carbodiimide group in the curing agent to the carboxyl group in the main agent was 0.5 to prepare a resin composition.

Example 2

A polycarbodiimide composition was obtained in the same manner as in Example 1, except that 21.2 parts by mass of PTG-250, 62.0 parts by mass of monool A, and 740.8 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Example 3

A polycarbodiimide composition was obtained in the same manner as in Example 1, except that 9.5 parts by mass of PTG-250, 83.9 parts by mass of monool A, and 781.9 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Example 4

A polycarbodiimide composition was obtained in the same manner as in Example 1, except that 35.1 parts by mass of PTG-650 (polytetramethylene ether glycol, molecular weight of 650) instead of PTG-250, 59.5 parts by mass of monool A, and 786.4 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Example 5

A polycarbodiimide composition was obtained in the same manner as in Example 1, except that 45.9 parts by mass of PTG-850 (polytetramethylene ether glycol, molecular weight of 850) instead of PTG-250, 59.5 parts by mass of monool A, and 829.6 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Example 6

A polycarbodiimide composition was obtained in the same manner as in Example 1, except that 18.2 parts by mass of PPG-280 (polypropylene glycol, molecular weight of 280) instead of PTG-250 and 766.1 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Example 7

The monool A (polyoxyethylene-polyoxypropylene monomethyl ether (EO ratio of 50% by mass, molecular weight of 550) obtained in Production Example 2) and an isobutanol were mixed at a mole ratio of 3:1. The obtained solution was referred to as a monool B.

Then, a polycarbodiimide composition was obtained in the same manner as in Example 1, except that 55.9 parts by mass of monool B and 696.6 parts by mass of PMA were used. An analytical value of the obtained polycarbodiimide composition is described in Table 1 (solution in which the polyoxyethylene-polyoxypropylene monomethyl ether (EO ratio of 50% by mass, molecular weight of 550) and the isobutanol are mixed at a mole ratio of 3:1 is referred to as the monool B in the table).

In addition, an aqueous dispersion of the polycarbodiimide composition was prepared in the same manner as in Example 1 to prepare a resin composition.

Example 8

A polycarbodiimide composition was obtained in the same manner as in Example 1, except that 11.3 parts by mass of 1,10-DD (1,10-decanediol) instead of PTG-250, 71.4 parts by mass of monool A, and 738.6 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Example 9

A polycarbodiimide composition was obtained in the same manner as in Example 1, except that 7.7 parts by mass of 1,6-HD (1,6-hexanediol) instead of PTG-250 and 724.1 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Example 10

A polycarbodiimide composition was obtained in the same manner as in Example 1, except that 69.5 parts by mass of PTG-1500 (polytetramethylene ether glycol, molecular weight of 1500) instead of PTG-250, 51.0 parts by mass of monool A, and 889.9 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Example 11

A polycarbodiimide composition was obtained in the same manner as in Example 1, except that 13.0 parts by mass of PCL 303 (Placcel 303, polycaprolactone triol, molecular weight of 300, manufactured by Daicel Corporation) instead of PTG-250 and 745.3 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Example 12

A polycarbodiimide composition was obtained in the same manner as in Example 1, except that 100.0 parts by mass of HDI (hexamethylene diisocyanate) instead of PDI, 14.9 parts by mass of PTG-250, 65.4 parts by mass of monool A, and 729.1 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Example 13

A polycarbodiimide composition was obtained in the same manner as in Example 1, except that 1724.1 parts by mass of PMA and 4.0 parts by mass of MPPO were used. An analytical value of the obtained polycarbodiimide composition is described in Table 1.

In addition, an aqueous dispersion of the polycarbodiimide composition was prepared in the same manner as in Example 1 to prepare a resin composition.

Example 14

Production of Polycarbodiimide Composition A polycarbodiimide composition was obtained in the same manner as in Example 1, except that 20.3 parts by mass of PTG-250, 12.0 parts by mass of isobutanol (iBA) instead of monool A, and 537.2 parts by mass of PMA were used. An analytical value of the obtained polycarbodiimide composition is described in Table 1.

Preparation of Solution (Solution Composition) of Polycarbodiimide Composition

The polycarbodiimide composition was put in a flask, and a butyl acetate was gradually added so as to have a resin solid content of 40%, and stirred to obtain a solution of the polycarbodiimide composition.

Preparation of Solvent-Based Resin Composition

The obtained solution of the polycarbodiimide composition was used as a curing agent. An acrylic resin (solid content of 50% by mass, carboxyl group equivalent of solid content of 2004 g/mol) was used as a main agent, and the curing agent and the main agent were mixed so that the equivalent ratio of the carbodiimide group in the curing agent to the carboxyl group in the main agent was 0.5 to prepare a resin composition.

Comparative Example 1

A polycarbodiimide composition was obtained in the same manner as in Example 1, except that 0.0 parts by mass of PTG-250, 101.9 parts by mass of monool A, and 815.7 parts by mass of PMA were used. An analytical value of the obtained polycarbodiimide compositions is described in Table 1.

In addition, an aqueous dispersion of the polycarbodiimide composition was prepared in the same manner as in Example 1 to prepare a resin composition.

Comparative Example 2

A polycarbodiimide composition was obtained in the same manner as in Example 1, except that 24.9 parts by mass of PTG-250, 54.9 parts by mass of monool A, and 727.35 parts by mass of PMA were used. An analytical value of the obtained polycarbodiimide composition is described in Table 1.

In addition, an aqueous dispersion of the polycarbodiimide composition was prepared in the same manner as in Example 1, and a uniform aqueous dispersion could not be obtained.

Comparative Example 3

A polycarbodiimide composition was obtained in the same manner as in Example 1, except that 27.0 parts by mass of PTG-250, 118.9 parts by mass of monool A, and 991.8 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Comparative Example 4

A polycarbodiimide composition was obtained in the same manner as in Example 1, except that 8.1 parts by mass of PTG-250, 35.7 parts by mass of UNIOX M550 (polyoxyethylene monomethyl ether, molecular weight of 550, manufactured by NOF CORPORATION), and 583.1 parts by mass of PMA were used. An analytical value of the obtained polycarbodiimide composition is described in Table 1.

In addition, an aqueous dispersion of the polycarbodiimide composition was prepared in the same manner as in Example 1 to prepare a resin composition.

Comparative Example 5

Production of Polycarbodiimide Composition

In a four-necked flask equipped with a stirrer, a thermometer, a reflux tube, and a nitrogen introduction tube, 200.0 parts by mass of 4,4-dicyclohexylmethane diisocyanate ($H_{12}$MDI) and 2.0 parts by mass of 3-methyl-1-phenyl-2-phospholene-1-oxide (MPPO) were added at room temperature. While introducing nitrogen, the reaction was carried out at 170° C. for seven hours, and a carbodiimide having three carbodiimide groups in one molecule, and having an isocyanate group at both ends was obtained (carbodiimidization step).

Next, in a four-necked flask equipped with a stirrer, a thermometer, a reflux tube, and a nitrogen introduction tube, 100.0 parts by mass of the obtained carbodiimide, 13.6 parts by mass of PTG-250, and 60.0 parts by mass of UNIOX M550 (polyoxyethylene monomethyl ether, molecular weight of 550, manufactured by NOF CORPORATION) were added, and the mixture was reacted at 120° C., while introducing nitrogen (urethanization step). The completion of the reaction was confirmed by infrared absorption (IR) spectroscopy which showed that the absorption peak around 2260 $cm^{-1}$ derived from stretching vibrations of isocyanate groups almost disappeared.

Preparation of Aqueous Dispersion (Aqueous Dispersion Composition) of Polycarbodiimide Composition The obtained polycarbodiimide composition derived from $H_{12}$MDI was put in a flask, and distilled water was gradually added so as to have a resin solid content of 40%, while heated at 80° C. The mixture was stirred for 5 minutes and then, cooled to obtain an aqueous dispersion of the polycarbodiimide composition.

Preparation of Aqueous Resin Composition

The obtained aqueous dispersion of the polycarbodiimide composition was used as a curing agent. A hydrophilic polyurethane having a carboxyl group (polyurethane dispersion, solid content of 30% by mass, and carboxyl group equivalent of solid content of 1122 g/mol) was used as a main agent, and the curing agent and the main agent were mixed so that the equivalent ratio of the carbodiimide group in the curing agent to the carboxyl group in the main agent was 0.5 to prepare a resin composition.

Comparative Example 6

A polycarbodiimide composition was synthesized in accordance with the method described in Synthesis Example 5 of Japanese Unexamined Patent Publication No. 2018-104605, and an aqueous dispersion of the polycarbodiimide composition was prepared in the same manner as in each Example.

In other words, in a four-necked flask equipped with a stirrer, a thermometer, a reflux tube, and a nitrogen introduction tube, 100.0 parts by mass of 4,4-dicyclohexylmethane diisocyanate ($H_{12}$MDI) and 0.5 parts by mass of 3-methyl-1-phenyl-2-phospholene-1-oxide (MPPO) were added at room temperature. While introducing nitrogen, the reaction was carried out at 180° C. for seven hours to obtain a carbodiimide having an isocyanate group at both ends (carbodiimidization step).

Next, in a four-necked flask equipped with a stirrer, a thermometer, a reflux tube, and a nitrogen introduction tube, 86 parts by mass (0.5 equivalent with respect to both-end isocyanate of carbodiimide) of UNIOX M550 (polyoxyethylene monomethylether, molecular weight of 550, manufactured by NOF CORPORATION) was added to the obtained carbodiimide to react at 150° C. for one hour. Thereafter, 77 parts by mass of PEG-1000 (polyoxyethylene glycol, weight average molecular weight of 1000) was added to further react for one hour (urethanization step). The completion of the reaction was confirmed by infrared absorption (IR) spectroscopy which showed that the absorption peak around 2260 $cm^{-1}$ derived from stretching vibrations of isocyanate groups almost disappeared.

Preparation of Aqueous Dispersion (Aqueous Dispersion Composition) of Polycarbodiimide Composition The obtained polycarbodiimide composition derived from $H_{12}$MDI was put in a flask, and distilled water was gradually added so as to have a resin solid content of 40%, while heated at 80° C. The mixture was stirred for 5 minutes and then, cooled to obtain an aqueous dispersion of the polycarbodiimide composition.

Preparation of Aqueous Resin Composition

The obtained aqueous dispersion of the polycarbodiimide composition was used as a curing agent. A hydrophilic polyurethane having a carboxyl group (polyurethane dispersion, solid content of 30% by mass, and carboxyl group equivalent of solid content of 1122 g/mol) was used as a main agent, and the curing agent and the main agent were mixed so that the equivalent ratio of the carbodiimide group in the curing agent to the carboxyl group in the main agent was 0.5 to prepare a resin composition.

<Evaluation>
<Stability Test>
Thermal Stability Test

The obtained polycarbodiimide composition (1.0 g) was put in a 10 mL-screw bottle to be subjected to nitrogen-blown, then, the bottle was capped with a screw cap, and stored at 40° C. to observe flowability. The criteria for evaluation are described as follows.

3: The flowability did not disappear in below two weeks.
2: The flowability disappeared in one week or more and below two weeks.
1: The flowability disappeared in below one week.

<Evaluation of Coating Film>

By using a 250 mill-doctor blade, the resin composition was applied to a standard test plate (JIS-G-3303 SPTE), and then, dried at 80° C. for five minutes and 10 minutes, and further dried at room temperature for one hour to obtain a coating film composed of a resin cured product. The obtained coating film was evaluated by the following method. In Comparative Example 2, since an aqueous dispersion was not obtained, it was not evaluated.

Appearance of Coating Film

The appearance of the coating film (coating film dried at 80° C. for five minutes) was visually evaluated. The criteria for the evaluation are described as follows.

5: Wrinkles were hardly observed.
4: Some wrinkles were observed.
3: Numerous wrinkles were observed.
2: Wrinkles and fractures were observed.
1: There were many wrinkles and fractures, so that it was not possible to evaluate the solvent resistance to be described later.

Solvent Resistance (Chemical Resistance)

A gauze infiltrated with methyl ethyl ketone in the case of an aqueous resin composition, or infiltrated with an aqueous solution of 50% ethanol in the case of a solvent-based resin composition was rubbed against a coating film (coating film dried at 80° C. for five minutes and coating film dried at 80° C. for 10 minutes) under a load of 50 g, and the number of times until the coating film was broken was measured. The criteria for the evaluation are described as follows.

5: The coating film was broken at 350 times or more.
4: The coating film was broken at 300 times or more and below 350 times.
3: The coating film was broken at 250 times or more and below 300 times.
2: The coating film was broken at 100 times or more and below 250 times.
1: The coating film was broken at below 100 times.

<Colour Fastness to Rubbing Test (Wet)>

The aqueous dispersions of the polycarbodiimide compositions obtained in Examples 1 to 13, Comparative Examples 1, 3 and 5 to 6 were evaluated by a colour fastness to rubbing test similar to JIS L 0849 (2013).

More specifically, first, a mixing solution of the following formulation was prepared.

Main agent: TAKELAC W-6110 (trade name, manufactured by Mitsui Chemicals, Inc.): 100 parts by mass Cross-linking agent: aqueous dispersion of polycarbodiimide composition: 2 parts by mass Pigment: AF-Blue E-2B (trade name, manufactured by Dainichiseika Color & Chemicals Mfg, Co., Ltd.): 23 parts by mass Distilled water: 75 parts by mass Next, a standard adjacent fabric for test used in JIS L 0849 (2013) (in conformity with JIS L 0803 (2011), cannequin No. 3) was cut into a piece having about 220 mm in length and about 30 mm in width, infiltrated with the above-described mixing solution, dried at room temperature for one night, and dried at 80° C. for five minutes to obtain a test piece.

On the other hand, the standard adjacent fabric for test (in conformity with JIS L 0803 (2011), cannequin No. 3) was cut into a piece having about 50 mm in length and about 50 mm in width, and moistened with distilled water to obtain a white fabric for friction.

Then, the test piece and the white fabric for friction described above were attached to No. 428 color fastness rubbing tester (manufactured by YASUDA SEIKI SEISAKUSHO, LTD., friction testing machine II type) to be rubbed under the conditions of a load of 200 g, a swing width of 100 mm, and the reciprocating number of 100 times (30 times/min).

An L value of the white fabric for friction after the friction was measured using a spectrophotometer (Spectro Color Meter 2000, manufactured by NIPPON DENSHOKU INDUSTRIES CO., LTD.).

It is indicated that the higher the L value is, the whiter it is and the smaller the degree of contamination is. The L value of the white fabric for friction before the test is 92.

TABLE 1

| No. | Ex. 1 | Ex. 2 | Ex. 3 | Ex. 4 | Ex. 5 |
|---|---|---|---|---|---|
| Diisocyanate | PDI | PDI | PDI | PDI | PDI |
| Mixing Mole Ratio | 10.0 | 11.5 | 8.5 | 12.0 | 12.0 |
| Polyol | PTG-250 | PTG-250 | PTG-250 | PTG-650 | PTG-850 |
| Functionality | 2 | 2 | 2 | 2 | 2 |
| Mixing Mole Ratio | 1.0 | 1.5 | 0.5 | 1.0 | 1.0 |
| Monool | Monool A | Monool A | Monool A | Monool A | Monool A |
| Mixing Mole Ratio | 2.0 | 2.0 | 2.0 | 2.0 | 2.0 |
| Hydroxyl Group Derived from Polyol/Hydroxyl Group Derived from Monool (Mole Ratio) | 1.0 | 1.5 | 0.5 | 1.0 | 1.0 |
| Urethanization Step R (NCO/OH) | 5.0 | 4.6 | 5.7 | 6.0 | 6.0 |
| Concentration of Solid Content at Reaction (%) | 20 | 20 | 20 | 20 | 20 |
| Carbodiimide Equivalent (Measured Value, g/mol) | 450 | 450 | 450 | 450 | 480 |
| Carbodiimide Equivalent (Caluculated Value, g/mol) | 317 | 317 | 318 | 316 | 336 |

TABLE 1-continued

| No. | Ex. 1 | Ex. 2 | Ex. 3 | Ex. 4 | Ex. 5 |
|---|---|---|---|---|---|
| 500 or less of Mn (%) | 4.2 | 3.9 | 4.5 | 4.5 | 4.3 |
| 1000 or less of Mn (%) | 6.6 | 6.3 | 7.2 | 6.3 | 6.2 |
| Viscosity at 25° C. (mPa · s) | 4000 | 7000 | 2500 | 4500 | 4600 |
| Thermal Stability at 40° C. | 3 | 3 | 3 | 3 | 3 |
| Appearance of Cured Film | 4 | 4 | 4 | 4 | 4 |
| Chemical Resistance at 80° C. in 5 minutes | 5 | 5 | 5 | 5 | 5 |
| Chemical Resistance at 80° C. in 10 minutes | 5 | 5 | 5 | 5 | 5 |

TABLE 2

| No. | Ex. 6 | Ex. 7 | Ex. 8 | Ex. 9 | Ex. 10 |
|---|---|---|---|---|---|
| Diisocyanate | PDI | PDI | PDI | PDI | PDI |
| Mixing Mole Ratio | 10.0 | 10.0 | 10.0 | 10.0 | 14.0 |
| Polyol | PPG-280 | PTG-250 | 1,10-DD | 1,6-HD | PTG-1500 |
| Functionality | 2 | 2 | 2 | 2 | 2 |
| Mixing Mole Ratio | 1.0 | 1.0 | 1.0 | 1.0 | 1.0 |
| Monool | Monool A | Monool B | Monool A | Monool A | Monool A |
| Mixing Mole Ratio | 2.0 | 2.0 | 2.0 | 2.0 | 2.0 |
| Hydroxyl Group Derived from Polyol/Hydroxyl Group Derived from Monool (Mole Ratio) | 1.0 | 1.0 | 1.0 | 1.0 | 1.0 |
| Urethanization Step R (NCO/OH) | 5.0 | 5.0 | 5.0 | 5.0 | 7.0 |
| Concentration of Solid Content at Reaction (%) | 20 | 20 | 20 | 20 | 20 |
| Carbodiimide Equivalent (Measured Value, g/mol) | 455 | 410 | 440 | 430 | 500 |
| Carbodiimide Equivalent (Caluculated Value, g/mol) | 321 | 288 | 308 | 301 | 353 |
| 500 or less of Mn (%) | 4.7 | 4.5 | 4.4 | 4.5 | 3.8 |
| 1000 or less of Mn (%) | 7.3 | 7.4 | 6.8 | 7.5 | 5.9 |
| Viscosity at 25° C. (mPa · s) | 3600 | 4500 | 4500 | 11000 | 5200 |
| Thermal Stability at 40° C. | 3 | 3 | 3 | 2 | 3 |
| Appearance of Cured Film | 4 | 4 | 4 | 4 | 4 |
| Chemical Resistance at 80° C. in 5 minutes | 5 | 5 | 5 | 5 | 4 |
| Chemical Resistance at 80° C. in 10 minutes | 5 | 5 | 5 | 5 | 4 |

TABLE 3

| No. | Ex. 11 | Ex. 12 | Ex. 13 | Ex. 14 |
|---|---|---|---|---|
| Diisocyanate | PDI | HDI | PDI | PDI |
| Mixing Mole Ratio | 15.0 | 10.0 | 10.0 | 8.0 |
| Polyol | PCL 303 | PTG-250 | PTG-250 | PTG-250 |
| Functionality | 3 | 2 | 2 | 2 |
| Mixing Mole Ratio | 1.0 | 1.0 | 1.0 | 1.0 |
| Monool | Monool A | Monool A | Monool A | iBA |
| Mixing Mole Ratio | 2.0 | 2.0 | 2.0 | 2.0 |
| Hydroxyl Group Derived from Polyol/Hydroxyl Group Derived from Monool (Mole Ratio) | 1.0 | 1.0 | 1.0 | 1.0 |
| Urethanization Step R (NCO/OH) | 5.0 | 5.0 | 5.0 | 4.0 |
| Concentration of Solid Content at Reaction (%) | 20 | 20 | 10 | 20 |
| Carbodiimide Equivalent (Measured Value, g/mol) | 445 | 475 | 450 | 325 |
| Carbodiimide Equivalent (Caluculated Value, g/mol) | 311 | 335 | 317 | 228 |
| 500 or less of Mn (%) | 4.2 | 4.3 | 7.8 | 3.5 |
| 1000 or less of Mn (%) | 5.7 | 6.7 | 10.3 | 9.5 |
| Viscosity at 25° C. (mPa · s) | 13000 | 4400 | 3200 | 8000 |
| Thermal Stability at 40° C. | 2 | 3 | 3 | 3 |

TABLE 3-continued

| No. | Ex. 11 | Ex. 12 | Ex. 13 | Ex. 14 |
|---|---|---|---|---|
| Appearance of Cured Film | 4 | 4 | 3 | 4 |
| Chemical Resistance at 80° C. in 5 minutes | 5 | 4 | 5 | 5 |
| Chemical Resistance at 80° C. in 10 minutes | 5 | 5 | 5 | 5 |

TABLE 4

| No. | Comparative Ex. 1 | Comparative Ex. 2 | Comparative Ex. 3 | Comparative Ex. 4 | Comparative Ex. 5 | Comparative Ex. 6 |
|---|---|---|---|---|---|---|
| Diisocyanate | PDI | PDI | PDI | PDI | H12MDI | H12MDI |
| Mixing Mole Ratio | 7.0 | 13.0 | 6.0 | 10.0 | 8.0 | 5.0 |
| Polyol | — | PTG-250 | PTG-250 | PTG-250 | PTG-250 | PEG-1000 |
| Functionality | 0 | 2 | 2 | 2 | 2 | 2 |
| Mixing Mole Ratio | 0.0 | 2.0 | 1.0 | 1.0 | 1.0 | 1.0 |
| Monool | Monool A | Monool A | Monool A | M550 | M550 | M550 |
| Mixing Mole Ratio | 2.0 | 2.0 | 2.0 | 2.0 | 2.0 | 2.0 |
| Hydroxyl Group Derived from Polyol/Hydroxyl Group Derived from Monool (Mole Ratio) | 0.0 | 2.0 | 1.0 | 1.0 | 1.0 | 1.0 |
| Urethanization Step R (NCO/OH) | 7.0 | 4.3 | 3.0 | 10.0 | 8.0 | 2.5 |
| Concentration of Solid Content at Reaction (%) | 20 | 20 | 20 | 20 | 100 | 100 |
| Carbodiimide Equivalent (Measured Value, g/mol) | 450 | 450 | 745 | 290 | 550 | 650 |
| Carbodiimide Equivalent (Caluculated Value, g/mol) | 319 | 316 | 525 | 202 | 531 | 623 |
| 500 or less of Mn (%) | 4.5 | 4.2 | 2.5 | 8.2 | 4.9 | 1.8 |
| 1000 or less of Mn (%) | 10.5 | 6.2 | 5.3 | 10.4 | 1.5 | 4.2 |
| Viscosity at 25° C. (mPa · s) | 1500 | 28000 | 1900 | 12000 | 100000< | 100000< |
| Thermal Stability at 40° C. | 3 | 1 | 3 | 1 | — | — |
| Appearance of Cured Film | 2 | — | 4 | 1 | 4 | 4 |
| Chemical Resistance at 80° C. in 5 minutes | 2 | — | 2 | — | 1 | 1 |
| Chemical Resistance at 80° C. in 10 minutes | 4 | — | 2 | — | 1 | 1 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The polycarbodiimide composition, the method for producing a polycarbodiimide composition, the aqueous dispersion composition, the solution composition, the resin composition, and the resin cured product of the present invention are preferably used in various fields such as coating materials, adhesive materials (adhesives), pressure-sensitive adhesive materials (pressure-sensitive adhesives), inks, sealants, molding materials, foams, optical materials, resin modifiers, textile printing treatment agents, and fiber treatment agents (carbodiimide cross-linking agents for fiber treatment).

The invention claimed is:
1. A polycarbodiimide composition comprising:
a carbodiimide modified product produced by subjecting a urethanization of a reaction product of a straight-chain aliphatic diisocyanate and alcohols to a carbodiimidization reaction, wherein
the alcohols include a polyol and a monool;
in the alcohols, a mole ratio of the amount of hydroxyl groups derived from the polyol to the amount of hydroxyl groups derived from the monool is 0.1 or more and below 2.0;

a carbodiimide equivalent of the polycarbodiimide composition is 300 g/mol or more and below 550 g/mol; and the carbodiimide equivalent is measured by $^{13}$C-NMR under the following conditions:

measurement frequency: 125 MHz, solvent: $CDCL_3$, solute concentration: 50% by mass;

measurement temperature: room temperature, number of scans: 8500 times;

repetition time: 3.0 seconds, pulse width: 30° (3.70 μ seconds);

assignment peak of carbon of carbodiimide group (N=C=N group in the carbodiimide group): 139 ppm;

assignment peak of carbon of uretonimine group (C=O group, C=N group in the uretonimine group): 159 ppm, 145 ppm;

assignment peak of carbon of allophanate group (C=O group in the allophanate group): 154 ppm; and assignment peak of carbon of urethane group (C=O group in the urethane group): 156 ppm.

2. The polycarbodiimide composition according to claim 1, wherein a molecular weight of the polyol is 120 or more and 1000 or less.

3. The polycarbodiimide composition according to claim 1, wherein an average functionality of the polyol is 2.

4. The polycarbodiimide composition according to claim 1, wherein the straight-chain aliphatic diisocyanate is a 1,5-pentane diisocyanate.

5. The polycarbodiimide composition according to claim 1, wherein in chromatogram obtained when the polycarbodiimide composition is measured by gel permeation chromatography, an area ratio of the peak area having a molecular weight of 500 or less in terms of polystyrene to the total peak area is 6.5% or less, and an area ratio of the peak area having a molecular weight of 1000 or less in terms of polystyrene to the total peak area is 10.0% or less.

6. The polycarbodiimide composition according to claim 1, wherein in the alcohols, the mole ratio of the amount of hydroxyl groups derived from the polyol to the amount of hydroxyl groups derived from the monool is 0.5 or more and below 2.0, and the carbodiimide equivalent of the polycarbodiimide composition is 325 g/mol or more and below 500 g/mol.

7. A method for producing a polycarbodiimide composition comprising:

a urethanization step of subjecting a straight-chain aliphatic diisocyanate and alcohols to a urethanization reaction, and a carbodiimidization step of heating a reaction product in the urethanization step in the presence of a carbodiimidization catalyst and subjecting the reaction product to a carbodiimidization reaction, wherein the alcohols include a polyol and a monool;

in the alcohols, a mole ratio of the amount of hydroxyl groups derived from the polyol to the amount of hydroxyl groups derived from the monool is below 2.0; and in the urethanization step, an equivalent ratio (NCO/OH) of isocyanate groups of the straight-chain aliphatic diisocyanate to the total amount of hydroxyl groups of the monool and hydroxyl groups of the polyol is 3 or more and below 8.

8. An aqueous dispersion composition being:

an aqueous dispersion solution obtained by dispersing the polycarbodiimide composition according to claim 1 in water at a ratio of solid content concentration of 5% by mass or more and 90% by mass or less.

9. A solution composition being:

a solution obtained by dissolving the polycarbodiimide composition according to claim 1 in an organic solvent at a ratio of solid content concentration of 5% by mass or more and 90% by mass or less.

10. A resin composition comprising:

a main agent having a carboxyl group and a curing agent including the polycarbodiimide composition according to claim 1.

11. A resin cured product being:

a cured product of the resin composition according to claim 9.

12. A carbodiimide cross-linking agent for fiber treatment comprising:

the polycarbodiimide composition according to claim 1.

* * * * *

UNITED STATES PATENT AND TRADEMARK OFFICE
CERTIFICATE OF CORRECTION

PATENT NO. : 12,359,063 B2
APPLICATION NO. : 17/265040
DATED : July 15, 2025
INVENTOR(S) : Tatsuya Yamashita et al.

It is certified that error appears in the above-identified patent and that said Letters Patent is hereby corrected as shown below:

In the Claims

Column 36, Line 60, (Claim 1), delete "a urethanization of a reaction" and insert --a urethanization reaction--.

Column 38, Line 43, (Claim 11), delete "claim 9" and insert --claim 10--.

Signed and Sealed this
Twenty-eighth Day of October, 2025

John A. Squires
*Director of the United States Patent and Trademark Office*